(12) United States Patent
Shimohara

(10) Patent No.: US 9,068,095 B2
(45) Date of Patent: *Jun. 30, 2015

(54) INK COMPOSITION, IMAGE FORMING METHOD AND PRINTED MATERIAL

(71) Applicant: FUJIFILM Corporation, Minato-ku, Tokyo (JP)

(72) Inventor: Norihide Shimohara, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/136,042

(22) Filed: Dec. 20, 2013

(65) Prior Publication Data

US 2014/0104357 A1    Apr. 17, 2014

Related U.S. Application Data

(63) Continuation of application No. PCT/JP2012/066093, filed on Jun. 18, 2012.

(30) Foreign Application Priority Data

Jun. 24, 2011  (JP) ................. 2011-140985

(51) Int. Cl.

| | |
|---|---|
| B41J 2/01 | (2006.01) |
| C09D 11/38 | (2014.01) |
| B41J 11/00 | (2006.01) |
| C09D 11/101 | (2014.01) |
| C09D 11/326 | (2014.01) |
| C09D 11/324 | (2014.01) |
| C09D 11/36 | (2014.01) |
| B41J 2/21 | (2006.01) |

(52) U.S. Cl.
CPC ............. *C09D 11/38* (2013.01); *B41J 2/2107* (2013.01); *B41J 11/0015* (2013.01); *C09D 11/101* (2013.01); *C09D 11/326* (2013.01); *B41J 11/002* (2013.01); *C09D 11/324* (2013.01); *C09D 11/36* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; B41J 11/002; C09D 11/36; C09D 11/40; C09D 11/30; C09D 11/38; C09D 11/322; C09D 11/328; C09D 11/101
USPC ............. 347/100, 95, 96, 101, 102, 20, 21, 9; 106/31.6, 31.27, 31.13; 523/160, 161

See application file for complete search history.

(56) References Cited

U.S. PATENT DOCUMENTS

| | | | | |
|---|---|---|---|---|
| 5,346,975 | A  * | 9/1994 | Aoshima et al. | 526/263 |
| 6,706,777 | B1 | 3/2004 | Biro et al. | |
| 2002/0028302 | A1 | 3/2002 | Okazaki et al. | |
| 2004/0110858 | A1 | 6/2004 | Biro et al. | |
| 2004/0110859 | A1 | 6/2004 | Biro et al. | |
| 2008/0085950 | A1 | 4/2008 | Ganapathiappan et al. | |
| 2008/0108747 | A1 * | 5/2008 | Nakamura et al. | 524/606 |
| 2009/0197056 | A1 * | 8/2009 | Yokoi et al. | 428/195.1 |
| 2011/0205291 | A1 * | 8/2011 | Yasuda et al. | 347/21 |

FOREIGN PATENT DOCUMENTS

| | | |
|---|---|---|
| CN | 1291201 A | 4/2001 |
| CN | 1330106 A | 1/2002 |
| EP | 1 666 504 A1 | 6/2006 |
| EP | 2 423 276 A1 | 2/2012 |

(Continued)

OTHER PUBLICATIONS

International Search Report, PCT/JP2012/066093, dated Sep. 6, 2012, 4 pages.

(Continued)

*Primary Examiner* — Manish S Shah
(74) *Attorney, Agent, or Firm* — Sughrue Mion, PLLC

(57) ABSTRACT

An ink composition with excellent solvent resistance of the recorded image and fixability to a recording medium which may be applicable to an ink jet recording method, and an image forming method using the ink composition are provided. An ink composition which includes a dispersion medium including (a) water, and particles of (b) a polymer compound and (b) the polymer compound includes a repeating unit having a partial structure represented by the following General Formula (1) is provided. In the following General Formula (1), $R^a$ and $R^b$, each independently, represent an alkyl group having the number of carbon atoms 1 to 4, and $R^a$ and $R^b$ may be bonded to each other to form an alicyclic structure with 4- to 6-membered ring and * represents a bonding site to a main chain or a side chain in the polymer compound.

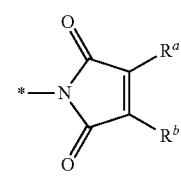

(1)

20 Claims, No Drawings

(56) References Cited

FOREIGN PATENT DOCUMENTS

| JP | 07-257014 A | 10/1995 |
| JP | 2002-053604 A | 2/2002 |
| JP | 2002-53604 A | 2/2002 |
| JP | 2002-241702 A | 8/2002 |
| JP | 2002-284829 A | 10/2002 |
| JP | 2007-161887 A | 6/2007 |
| JP | 2007-197544 A | 8/2007 |

OTHER PUBLICATIONS

Written Opinion, PCT/JP2012/066093, dated Jun. 18, 2012, 6 pages.
Notice of Reasons for Rejections dated Nov. 3, 2014, issued in corresponding CN Application No. 201280030454.2.
Notice of Reasons for Rejection dated Feb. 16, 2015, issued in corresponding Japanese Application No. P2011-140985.

\* cited by examiner

INK COMPOSITION, IMAGE FORMING METHOD AND PRINTED MATERIAL

BACKGROUND OF THE INVENTION

1. Field of the Invention

The present invention relates to an ink composition applicable to an ink jet recording, an image forming method using the ink composition and a printed material formed from the ink composition.

2. Description of the Related Art

As an image recording method in which the image is formed on a recording medium such as paper based on an image data signal, there is an ink jet recording method.

The ink jet recording method is a recording method in which a liquid ink composition is discharged from a nozzle toward the recording medium using pressure, heat, an electric field or the like as a driving source and then recorded. The ink jet recording method described above has rapidly come into widespread use in recent years since operating costs are low, and high image quality is possible.

Among the ink compositions used in image recording by the image recording method, an active energy ray curable aqueous ink may be suitably used in printing of the image, with pre-treatment to apply a suitable printing property to the recording medium, and after-treatment such as protection and decoration of the printed image. Also, the active energy ray curable aqueous ink is excellent in safety since water is a main component, can be applied as high-density ink jet recording due to reduced viscosity and the like, and has many excellent features and possibilities.

As an aqueous ink composition, for example, an ink composition which includes an aqueous active energy ray polymerizable substance containing a cross-linking water-soluble polymer and cross-linking fine particles has been disclosed (for example, see JP2007-161887A). However, there is still room for improvement in water-resistance and solvent resistance of the formed image, there is also a demand for improvement in fixability (fixing property) of the image evaluated by the stickiness of the image after energy has been applied, and particularly, there is a strong demand for a system in which a polymerization initiator is not used at all, or in very small amounts.

Meanwhile, from the viewpoint of water-resistance improvement of the ink image, an ink jet ink composition containing fine resin particles made of a reactive polymer, a water-soluble polymerizable polymer and a pigment (for example, see JP2002-241702A) or the like, an ink jet ink composition containing a (meth)acrylate compound having a specified bulky partial structure and a polymerizable compound having a reactive group (for example, see JP2007-197544A), and an ink jet ink composition containing a coloring agent, a hydrophilic polymer and an aqueous medium which includes a reactive component (for example, see JP1995-257014A (JP-H7-257014A)) and the like have been disclosed.

SUMMARY OF THE INVENTION

However, JP2002-241702A discloses a technology relating to a composition for outdoor paint, and the discharging property of an ink composition when an image is formed by the ink jet recording method has not been studied. Also, when the image is recorded using the water-based ink compositions disclosed in JP2007-197544A and JP1995-257014A9 (JP-H7-257014A), solvent resistance of the image is not yet satisfactory from a practical viewpoint, and also there is still room for improvement in fixability to the recording medium of the recorded image in each of the technologies described above.

The present invention has been made in view of the above described problems and an object of the invention is to provide an ink composition with excellent solvent resistance, that is, a resistance to solvent of the recorded image, and with excellent fixability of the image to the recording medium. In particular, challenges are to provide an ink composition for ink jet recording with an excellent discharging property in the image recording even when applied to the ink jet recording method, and also with excellent solvent resistance of the recorded image and fixability to the recording medium.

A further object of the present invention is to provide an image forming method in which the ink composition of the present invention is used and to provide a printed material providing an image with excellent solvent resistance and fixability to the recording medium.

An ink composition of the present invention to accomplish the above challenges comprises a dispersion medium including (a) water, and particles of (b) a polymer compound existing in the dispersion medium, and (b) the polymer compound includes a repeating unit having a partial structure represented by the following General Formula (1).

[Chem. 1]

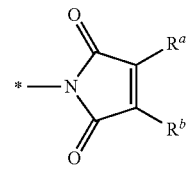

(1)

In the General Formula (1), $R^a$ and $R^b$, each independently, represent an alkyl group having the number of carbon atoms 1 to 4 and $R^a$ and $R^b$ may be bonded to each other to form an alicyclic structure with a 4- to 6-membered ring. * represents a bonding site to a main chain or a side chain in the polymer compound.

Also, in the ink composition of the present invention, it is preferable that (b) the polymer compound be a polymer compound further including a hydrophilic group.

Also, in the ink composition of the present invention, it is more preferable that the content of the particles of (b) the polymer compound in the ink composition be 2.0 mass % to 15 mass %.

Also, in the ink composition of the present invention, it is more preferable that the repeating unit included in (b) the polymer compound be a repeating unit represented by the following General Formula (2).

[Chem. 2]

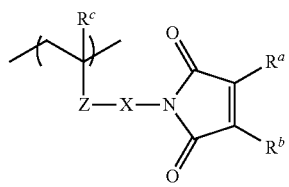

(2)

In the General Formula (2), $R^a$ and $R^b$, each independently, represent an alkyl group having the number of carbon atoms 1 to 4 and $R^a$ and $R^b$ may be bonded to each other to form an alicyclic structure with a 4- to 6-membered ring. $R^c$ represents a hydrogen atom or a methyl group. Z represents —COO— or —CONR$^d$—, $R^d$ represents a hydrogen atom or an alkyl group having the number of carbon atoms 1 to 4. X represents a divalent organic group.

In the ink composition of the present invention, it is preferable that (b) the polymer compound be a polymer compound which includes a repeating unit having at least one hydrophilic group selected from the group consisting of an alcoholic hydroxyl group, an alkyl-substituted carbamoyl group, a carboxyl group, a sulfo group and salts thereof.

It is preferable that the ink composition of the present invention further include (c) a polymerizable compound having a different structure from that of (b) the polymer compound.

It is preferable that (c) the polymerizable compound include one or more types of polymerizable low molecular compound with a molecular weight of greater than or equal to 100 and less than 1,000.

It is preferable that (c) the polymerizable compound include one or more types of polymerizable polymer compound with a molecular weight of greater than or equal to 1,000 and less than 50,000.

It is preferable that (c) the polymerizable compound include one or more types of polymerizable low molecular compound with a molecular weight of greater than or equal to 100 and less than 1,000 and include one or more types of polymerizable polymer compound with a molecular weight of greater than or equal to 1,000 and less than 50,000.

It is preferable that the volume average particle diameter of (b) the polymer compound particles be greater than or equal to 20 nm and less than 300 nm.

It is preferable that the ink composition of the present invention further include (d) a pigment dispersion.

It is preferable that (d) the pigment dispersion be a resin-coated pigment dispersion.

It is preferable that the ink composition of the present invention further include (e) a water-soluble organic solvent.

It is preferable that the ink composition of the present invention further include (f) a photopolymerization initiator.

It is preferable that the ink composition of the present invention further include (g) a surfactant.

It is preferable that the ink composition of the present invention be for ink jet recording.

The image forming method of the present invention includes an ink applying step in which the ink composition of the present invention is applied on a recording medium and an irradiating step in which the ink composition applied on the recording medium is irradiated with active energy radiation.

The image forming method of the present invention includes an ink applying step in which the ink composition of the present invention is applied on a recording medium, an ink drying step in which at least part of (a) the water and (e) the water-soluble organic solvent contained in the ink composition applied on the recording medium is dried and removed, and an irradiating step in which the ink composition applied on the recording medium is irradiated with active energy radiation.

A printed material of the present invention comprises an image formed from the ink composition of the present invention on a recording medium.

Also, the printed material of the present invention having an image is formed by the image forming method of the present invention.

According to the present invention, the ink composition with excellent solvent resistance, a resistance to the solvent of the recorded image and excellent fixability to the recording medium of the image may be provided. Also, the ink composition for ink jet recording with an excellent discharging property in the image recording even when applied to the ink jet recording method and also with excellent solvent resistance of the recorded image and fixability to the recording medium may be provided.

Also, according to the present invention, the image forming method in which the ink composition of the present invention is used, and the printed material providing an image with excellent solvent resistance and fixability to the recording medium may be provided.

DESCRIPTION OF THE PREFERRED EMBODIMENTS

[Ink Composition]

The ink composition of the present invention is an ink composition containing particles of (b) the polymer compound including the repeating unit having the partial structure represented by the following General Formula (1) and (a) water, and particles of (b) the polymer compound including the repeating unit having the partial structure represented by the following General Formula (1) exist in a state of dispersion in the dispersion medium including (a) the water. That is, the particles of (b) the polymer compound exist in the dispersion medium including (a) the water as a solid dispersion. The ink composition of the present invention may also include other solid dispersions such as the pigment dispersion.

Hereinafter, the polymer compound including the repeating unit having the partial structure represented by the following General Formula (1) is, appropriately, referred to as "(b-1) specific polymer".

[Chem. 3]

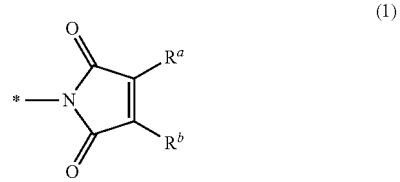

(1)

In the General Formula (1), $R^a$ and $R^b$, each independently, represent an alkyl group having the number of carbon atoms 1 to 4 and $R^a$ and $R^b$ may be bonded to each other to form an alicyclic structure with a 4- to 6-membered ring. * represents a bonding site to the polymer compound.

Hereinafter, the ink composition of the present invention (hereinafter, simply referred to as "ink composition") is described in detail.

<Particles of (b) Polymer Compound>

The ink composition used in the present invention at least includes the particles of the polymer compound including the repeating unit having the structure represented by the General Formula (1) in the aqueous dispersion medium.

The ink composition of the present invention may include a variety of liquid or solid compounds as an additive as necessary, in addition to the particles of (b) the polymer compound and (a) the water which is the main component of the dispersion medium, within the range that effects of the present invention are not impaired. For example, by further including (c) a polymerizable compound described below, curability and fixability of images are improved, and by further including a polymerization inhibitor or the like, the ink composition with excellent preservation stability is provided.

As the (b-1) specific polymer which composes the particles of (b) the polymer compound, it is preferable that a compound further include a hydrophilic group within the molecule, and, particularly, it is preferable that the repeating unit having a partial structure represented by the General Formula (1) be a repeating unit represented by the following General Formula (2), and also, the (b-1) specific polymer include a repeating unit having a hydrophilic group as a copolymerization component.

[Chem. 4]

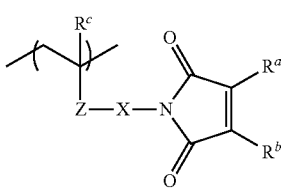

(2)

In the General Formula (2), $R^a$ and $R^b$, each independently, represent an alkyl group having the number of carbon atoms 1 to 4 and $R^a$ and $R^b$ may be bonded to each other to form an alicyclic structure with a 4- to 6-membered ring. $R^c$ represents a hydrogen atom or a methyl group. Z represents —COO— or —CONR$^d$—, $R^d$ represents a hydrogen atom or an alkyl group having the number of carbon atoms 1 to 4. X represents a divalent organic group.

[(b-1) Specific Polymer]

The (b-1) specific polymer which composes the particles of (b) the polymer compound is a polymer compound including the repeating unit having the structure represented by the General Formula (1).

In the General Formula (1), $R^a$ and $R^b$, each independently, represent a hydrogen atom or an alkyl group having the number of carbon atoms 1 to 4, a carbon number of 1 to 2 (a methyl group or an ethyl group) is preferable, and an alkyl group having the number of carbon atoms 1 (a methyl group) is particularly preferable. When at least one of $R^a$ and $R^b$ represents an alkyl group, the alkyl group may have a straight chain structure or a branched structure. Specifically, a methyl group, an ethyl group, a propyl group, an isopropyl group, a butyl group, an isobutyl group, a sec-butyl group, a t-butyl group or the like may also be preferable. In addition, $R^a$ and $R^b$ may be bonded to each other to form an alicyclic structure with a 4- to 6-membered ring.

In the General Formula (1), when at least one of $R^a$ and $R^b$ represent an alkyl group, the alkyl group may or may not have a substituent, however, it is preferable that the alkyl group do not have a substituent.

Specific examples of the partial structure represented by the General Formula (1) are shown below, however, the present invention is not limited to these. * in the following structures is the same as that in the General Formula (1).

[Chem. 5]

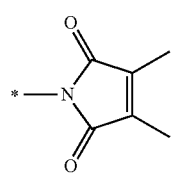

(A-1)

-continued

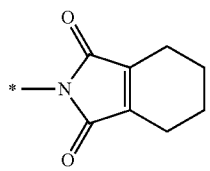

(A-2)

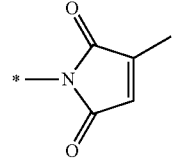

(A-3)

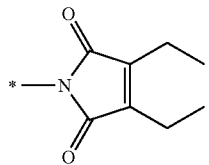

(A-4)

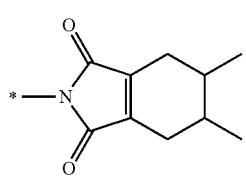

(A-5)

The (b-1) specific polymer related to the present invention may have the partial structure represented by the General Formula (1) at the terminal of a main chain or the partial structure introduced at a main chain or a side chain of the polymer compound by a polymer reaction; however, an aspect having a plurality of partial structures at the side chain is preferable from the viewpoint of effects, and the polymer compound having the repeating structure represented by the following General Formula (2) is preferable.

[Chem. 6]

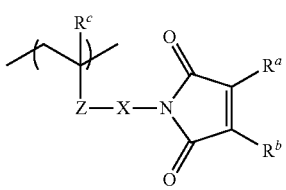

(2)

In the General Formula (2), $R^a$ and $R^b$, each independently, represent an alkyl group having the number of carbon atoms 1 to 4 and $R^a$ and $R^b$ may be bonded to each other to form an alicyclic structure with a 4- to 6-membered ring. $R^c$ represents a hydrogen atom or a methyl group. Z represents —COO— or —CONR$^d$—, $R^d$ represents a hydrogen atom or an alkyl group having the number of carbon atoms 1 to 4. X represents a divalent organic group.

$R^a$ and $R^b$ in the General Formula (2) are the same as those presented in the General Formula (1) described above and so are the preferable ranges.

In the General Formula (2), $R^c$ represents a hydrogen atom or a methyl group. It is preferable that $R^c$ be a methyl group.

In the General Formula (2), Z represents a single bond, —COO—*, or —CONR$^d$—*; $R^d$ represents a hydrogen atom or an alkyl group having the number of carbon atoms 1 to 4; and * represents a bonding site to X. It is preferable that Z be —COO—*.

Also, $R^d$ in the —CONR$^d$—* represents a hydrogen atom or an alkyl group having the number of carbon atoms 1 to 4. The alkyl group having the number of carbon atoms 1 to 4 may have a straight chain structure or a branched structure. Specifically, a methyl group, an ethyl group, a propyl group, an isopropyl group, a butyl group, an isobutyl group, a sec-butyl group, a t-butyl group or the like may be included. $R^d$ is preferably a hydrogen atom or an alkyl group having the number of carbon atoms 1 to 2, that is, a methyl group or an ethyl group, and particularly preferably a hydrogen atom. Also, when $R^d$ represents an alkyl group, the alkyl group may or may not have a substituent, however, it is preferable that the alkyl group do not have a substituent.

In the General Formula (2), X represents a divalent organic group. As the divalent organic group, an alkylene group having the number of carbon atoms 2 to 20, or an aralkylene group having the number of carbon atoms 6 to 12 may be included and the alkylene group may include —O—, —COO—, —OC(=O)—, or —CONH— in its structure. Also, the alkylene group may be substituted with an alkyl group with a carbon number of less than or equal to 4, a hydroxyl group, or a chlorine atom. An alkylene group is preferable. The alkylene group may have a straight chain structure or have a branch in the alkylene chain, or have a cyclic structure. Also, in the alkylene chain, a structure selected from an ether bond, an ester bond, an amide bond, and a urethane bond may exist. When X is the alkylene group, the carbon number of the alkylene group is preferably 2 to 20, more preferably 2 to 12, and even more preferably 2 to 8. By making the carbon number of a divalent linking group be within the preferable range, mobility of the partial structure represented by the General Formula (1) existing at the terminal of the side chain is improved, therefore, the effect of the preset invention is further improved.

In the General Formula (2), it is preferable that $R^a$ and $R^b$, each independently, represent an alkyl group having the number of carbon atoms 1 to 2, $R^c$ be a methyl group, Z be —COO—, and X be an alkylene group having the number of carbon atoms 2 to 12.

The content of the repeating unit represented by the General Formula (2) contained in the (b-1) specific polymer may be appropriately selected depending on the nature of a cured film obtained through the ink composition aimed for. In other words, for the purpose of obtaining a robust ink image, the content of the repeating unit represented by the General Formula (2) needs to be increased and for the purpose of obtaining a flexible cured film, the content of the repeating unit represented by the General Formula (2) needs to be decreased. The content of the repeating unit represented by the General Formula (2) considering this is preferably 5 mass % to 95 mass % based on the mass of the (b-1) specific polymer, more preferably 15 mass % to 95 mass %, and particularly preferably 30 mass % to 95 mass %.

The polymer compound including the repeating unit represented by the General Formula (2) may be obtained from polymerization of a monomer represented by the following General Formula (2').

[Chem. 7]

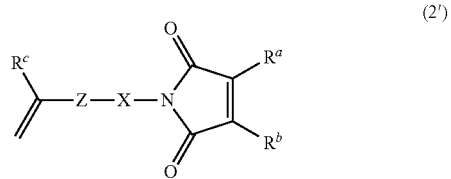

In the General Formula (2'), $R^a$, $R^b$, $R^c$, Z and X are the same as $R^a$, $R^b$, $R^c$, Z and X in the General Formula (2) described above, respectively, and so are the preferable ranges.

As preferable examples of the monomer represented by the General Formula (2'), following monomer compounds (2'-1) to (2'-11) may be included, however, the present invention is not limited to these.

[Chem. 8]

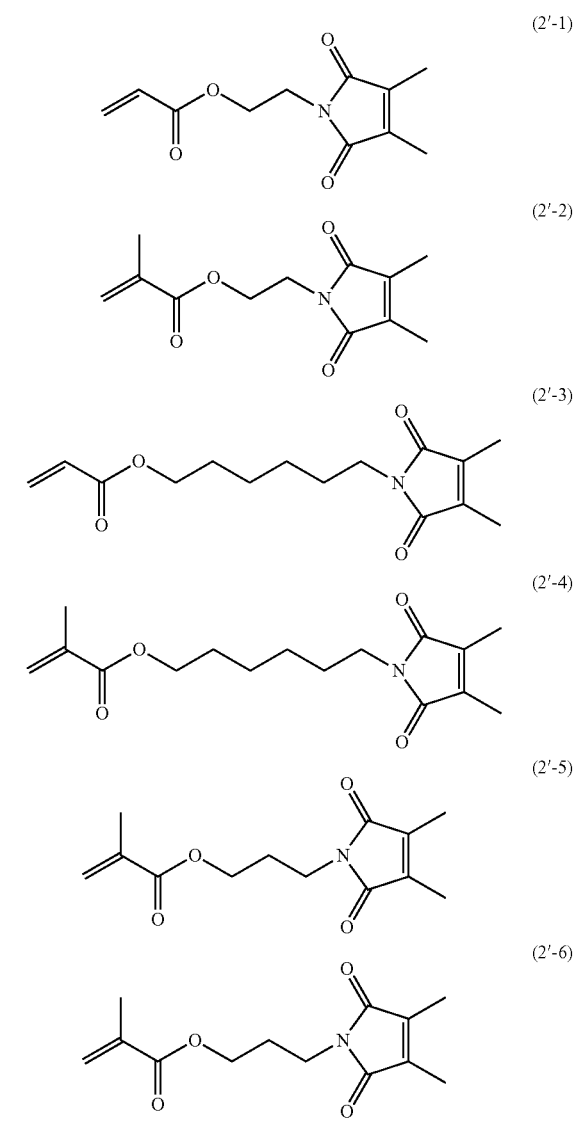

-continued (2'-7)
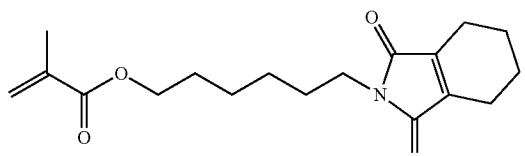

(2'-8)
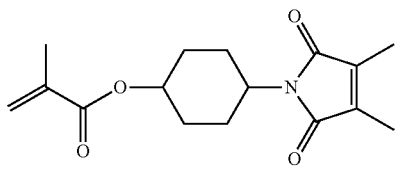

(2'-9)
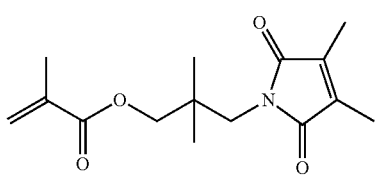

(2'-10)
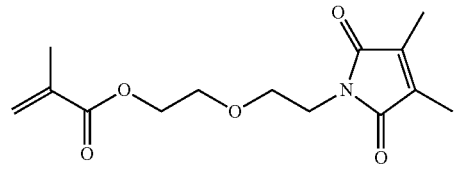

(2'-11)
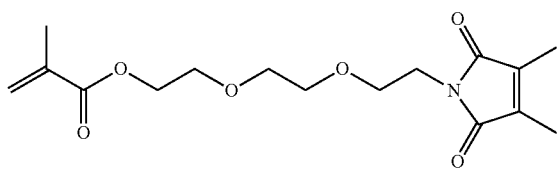

The monomers (2'-1) to (2'-11) according to the present invention may be produced with reference to the methods disclosed in, for example, JP1977-988A (JP-S52-988A), JP1992-251258A (JP-H4-251258A) or the like.

The (b-1) specific polymer also preferably has a repeating unit having a hydrophilic group. Here, a hydrophilic group may be both a nonionic hydrophilic group and an ionic hydrophilic group such as anionic or cationic as long as the group has a function to increase the hydrophilicity of the (b-1) specific polymer and is not particularly limited.

The number of hydrophilic groups included in the (b-1) specific polymer is not limited, however, the number is appropriately selected depending on the type of the hydrophilic group, molecular weight of the (b-1) specific polymer or the like.

The nonionic hydrophilic group and the ionic hydrophilic group introduced to the (b-1) specific polymer according to the present invention are not particularly limited, however, for example, a nonionic hydrophilic group such as a residue in which one hydrogen atom is removed from a heterocyclic structure containing a nitrogen atom or an oxygen atom, an amide group, a carbamoyl group, an alkyl substituted carbamoyl group, an alcoholic hydroxyl group and a group having a polyalkyleneoxy structure;
an ionic hydrophilic group such as a carboxyl group, a sulfo group, a phosphate group, a phosphonic acid group, a phenolic hydroxyl group or a quaternary ammonium group may be included.

As the heterocyclic structure containing a nitrogen atom or an oxygen atom, lactones such as γ-butyrolactone, cyclic ureas such as 2-pyrrolidone or ethylene urea, cyclic carbonates such as ethylene carbonate or propylene carbonate, and cyclic ethers such as tetrahydrofuran or 1,4-dioxane may be included.

The ionic hydrophilic group may form a salt.

Among these, an amide group, a carbamoyl group, an alkyl substituted carbamoyl group, an alcoholic hydroxyl group, a group having a polyalkyleneoxy structure, a carboxyl group, or a sulfo group is preferable and an alcoholic hydroxyl group, an alkyl substituted carbamoyl group, a carboxyl group, or a sulfo group is more preferable.

As the amide group, an amide group having the number of carbon atoms 2 to 10 is preferable and a nitrogen atom of the amide group is bonded preferably to a hydrogen atom. As the alkyl substituted carbamoyl group, a monoalkylcarbamoyl group in which a hydrogen atom bonded to a nitrogen atom of the carbamoyl group is substituted with an alkyl group, or a dialkylcarbamoyl group in which two hydrogen atoms bonded to a nitrogen atom of the carbamoyl group are substituted with an alkyl group may be included. Of these, a monoalkylcarbamoyl group which is substituted with an alkyl group having the number of carbon atoms 1 to 4 substituted with an alkyl group having the number of carbon atoms 1 to 8 or a hydroxyl group is preferable. As the group having a polyalkyleneoxy structure, while not limited, a polyalkyleneoxy structure having an alkyleneoxy group having the number of carbon atoms 1 to 4 as a repeating unit is preferable. The alkyleneoxy group in the polyalkyleneoxy structure may be used alone or as a combination of two or more. The terminal group of the polyalkyleneoxy structure is preferably a hydroxyl group or an alkoxy group and more preferably a hydroxyl group or a methoxy group.

As the ionic hydrophilic group, a carboxyl group, a sulfo group, a phosphate group, a phosphonic acid group, a phenolic hydroxyl group, a quaternary ammonium group or the like and the salts thereof may be included. As a salt with a counterion, an alkali metal salt (Li, Na, K or the like) or an onium salt such as an ammonium salt, a pyridinium salt, or a phosphonium salt may be included. Among these, an alkali metal salt (Li, Na, K or the like) or an ammonium salt is preferable.

If the (b-1) specific polymer relating to the present invention further includes a repeating unit having a hydrophilic group, it is preferable that the repeating unit having the hydrophilic group be represented by the following General Formula (3).

[Chem. 13]

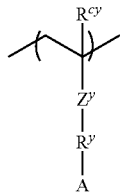

(3)

In the General Formula (3), $R^{cy}$ represents a hydrogen atom or a methyl group. $Z^y$ represents —COO—* or —CON-$R^{dy}$—* or a single bond, and $R^{dy}$ represents a hydrogen atom or an alkyl group having the number of carbon atoms 1 to 4. $R^y$ is a group selected from the group consisting of a single bond, or an alkylene group, an arylene group, and an aralkylene group. A represents a hydrophilic group. In addition, * represents a bonding site to R.

$R^{cy}$ in the General Formula (3) represents a hydrogen atom or a methyl group.

In the General Formula (3), $Z^y$ represents —COO—* or —CONR$^{dy}$—* or a single bond and is preferably —COO—*. Also, * represents a bonding site to $R^y$. $R^{dy}$ represents a hydrogen atom or an alkyl group having the number of carbon atoms 1 to 4. The alkyl group having the number of carbon atoms 1 to 4 may have a straight chain structure or a branched structure. Specifically, a methyl group, an ethyl group, a propyl group, an isopropyl group, a butyl group, an isobutyl group, a sec-butyl group, a t-butyl group or the like may be included. $R^{dy}$ is preferably a hydrogen atom or an alkyl group having the number of carbon atoms 1 to 2, that is, a methyl group or an ethyl group, and particularly preferably a hydrogen atom. Also, when $R^{dy}$ represents an alkyl group having the number of carbon atoms 1 to 4, the alkyl group may or may not have a substituent, however, it is preferable that the alkyl group do not have a substituent.

As the substituent which the $R^{dy}$ may have, an aryl group having the number of carbon atoms 6 to 8, an alkoxy group having the number of carbon atoms 1 to 8, a hydroxyl group, a carboxyl group, a halogen atom (F, Cl, Br, I or the like) or the like may be included.

In the General Formula (3), $R^y$ represents a group selected from the group consisting of a single bond, an alkylene group, an arylene group, and an aralkylene group, and an alkylene group having the number of carbon atoms 1 to 20, an arylene group having the number of carbon atoms 6 to 20, and or an aralkylene group having the number of carbon atoms 7 to 20 is preferable. These groups may or may not have a substituent. Also, in these groups, an ether bond, an ester bond, an amide bond, and a urethane bond may exist. In the General Formula (3), $R^y$ is preferably a single bond.

As the substituent which the $R^y$ may have, an aryl group having the number of carbon atoms 6 to 8, an alkoxy group having the number of carbon atoms 1 to 8, a hydroxyl group, a carboxyl group, a halogen atom (F, Cl, Br, I or the like) or the like may be included.

When $R^y$ is the alkylene group having the number of carbon atoms 1 to 20, the alkylene group may have a straight chain structure, have a branched structure, have a cyclic structure, or have a cyclic structure in the straight chain structure and the branched structure. When $R^y$ is the alkylene group, the carbon number is more preferably 2 to 12, and even more preferably 2 to 8. As specific examples of $R^y$ as the alkylene group, —CH$_2$—, —C$_2$H$_4$—, —C(CH$_3$)$_2$—CH$_2$—, —CH$_2$C(CH$_3$)$_2$CH$_2$—, —C$_6$H$_{12}$—, —C$_4$H$_7$(C$_4$H$_9$)C$_4$H$_8$—, —C$_{18}$H$_{36}$—, a 1,4-trans-cyclohexylene group, —C$_2$H$_4$—OCO—C$_2$H$_4$—, —C$_2$H$_4$—COO—, —C$_2$H$_4$—O—C$_5$H$_{10}$—, —CH$_2$—O—C$_5$H$_9$(C$_5$H$_{11}$)—, —C$_2$H$_4$—CONH—C$_2$H$_4$—, —C$_4$H$_8$—OCONH—C$_6$H$_{12}$—, —CH$_2$—OCONHC$_{10}$H$_{20}$—, —CH$_2$CH(OH)CH$_2$— or the like may be included.

When $R^y$ is the arylene group having the number of carbon atoms 6 to 20, a carbon number of the arylene group is preferably 6 to 18, more preferably 6 to 14, and even more preferably 6 to 10. As specific examples of $R^y$ as the arylene group, a phenylene group, a biphenylene group, —C$_6$H$_4$—CO—C$_6$H$_4$—, and a naphthylene group may be included.

When $R^y$ is the aralkylene group having the number of carbon atoms 7 to 20, a carbon number of the aralkylene group is preferably 7 to 18, more preferably 7 to 14, and even more preferably 7 to 10. As specific examples of the aralkylene group, —C$_3$H$_6$—C$_6$H$_4$—, —C$_2$H$_4$—C$_6$H$_4$—C$_6$H$_4$—, —CH$_2$—C$_6$H$_4$—C$_6$H$_4$—C$_2$H$_4$—, —C$_2$H$_4$—OCO—C$_6$H$_4$—, and the like may be included.

As a hydrophilic group represented as A in the General Formula (3), the hydrophilic group described above may be used and so may the preferable range.

If the (b-1) specific polymer have the repeating unit having the hydrophilic group represented by the General Formula (3) and the hydrophilic group A in the General Formula (3) is ionic, the content of the repeating unit represented by the General Formula (3) in the (b-1) specific polymer having the partial structure represented by the General Formula (1) is preferably 1 to 30 mass % based on the (b-1) specific polymer, more preferably 1 to 20 mass %, and particularly preferably 1 to 15 mass %, and also when the hydrophilic group A in the General Formula (3) is nonionic is preferably 20 to 95 mass % based on the (b-1) specific polymer, more preferably 30 to 80 mass %, and particularly preferable 30 to 70 mass %.

The favorable content of the hydrophilic group is different depending on the type thereof, however, the content needs to be such that the (b-1) specific polymer which composes the particles of (b) the polymer compound does not become water-soluble.

The structure represented by the General Formula (3) may be obtained from polymerization of monomers represented by the following General Formula (3').

[Chem. 14]

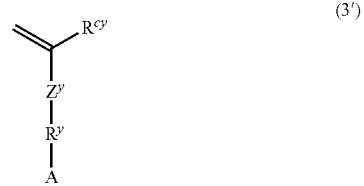

In the General Formula (3'), $R^{cy}$, $Z^y$, $R^y$, and A are the same as $R^{cy}$, $Z^y$, $R^y$, and A in the General Formula (3), respectively, and so are the preferable ranges.

As preferable examples of the monomer represented by the General Formula (3'), the following monomer compounds may be included, however, the present invention is not limited to these.

Methoxy polyethylene glycol (meth)acrylate, polyethylene glycol (meth)acrylate, polypropylene glycol (meth)acrylate, poly(ethylene glycol-co-propylene glycol) (meth)acrylate, 2-hydroxyethyl(meth)acrylate, glycerol (meth)acrylate (meth)acryloyloxyethylene urea, vinyl pyrrolidone, 3-(meth)acryloyloxy-γ-butyrolactone, acrylamide, tert-butyl acrylamide, N,N-dimethyl(meth)acrylamide, diacetone acrylamide, sodium (meth)acrylate, potassium (meth)acrylate, tetrabutylammonium (meth)acrylate, mono(meth)acryloyloxyethyl succinic acid, sodium mono(meth)acryloyloxyethyl succinate, sodium mono(meth)acryloyloxyethyl phthalate, (meth)acryloyloxyethyl phosphate, sodium 2-acrylamide-2-methylpropane sulfonate, 2-acrylamide-2-methylpropane sulfonic acid, styrene sulfonic acid, sodium styrene sulfonate, vinyl benzoic acid, or the like may be included.

The example compounds having the repeating units represented by the General Formula (3') according to the present invention may be commercially available compounds or produced by well-known, common methods.

Also, in the present invention, besides the example compounds having the repeating units represented by the General Formula (3'), an unsaturated dicarboxylic acid such as maleic acid, maleic acid anhydride, or fumaric acid and anhydride thereof, or dicarboxylate salts derived from these may be preferably used.

The (b-1) specific polymer relating to the present invention may be a copolymer including other monomer components in addition to the repeating unit derived from each of the monomers. The monomer represented by the General Formula (2') and other monomers which may be copolymerized with the monomer represented by the General Formula (3') may include styrenes such as styrene or p-methoxystyrene, or (meth)acrylates such as methyl (meth)acrylate, ethyl (meth)acrylate, allyl (meth)acrylate, butyl (meth)acrylate, hexyl (meth)acrylate, 2-ethylhexyl (meth)acrylate, octyl (meth)acrylate, decyl (meth)acrylate, stearyl (meth)acrylate, cyclohexyl (meth)acrylate, bornyl (meth)acrylate, isobornyl (meth)acrylate, benzyl (meth)acrylate, 2-ethylhexyl diglycol (meth)acrylate, butoxyethyl (meth)acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, 2,2,2-trifluoroethyl (meth)acrylate, 4-butylphenyl (meth)acrylate, phenyl (meth)acrylate, 2,4,5-trimethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, butoxy diethylene glycol (meth)acrylate, triflouoroethyl (meth)acrylate, perflouorooctylethyl (meth)acrylate, or the like may be included, and preferably, an alkyl (meth)acrylate having the number of carbon atoms 1 to 8 such as methyl (meth)acrylate, ethyl (meth)acrylate, butyl (meth)acrylate, hexyl (meth)acrylate, or 2-ethylhexyl (meth)acrylate may be included. Also, well-known monomers besides the above may be used as necessary.

As the content of the other monomers, 0 to 60 mass % with regard to the specific polymer is preferable, 0 to 40 mass % is more preferable, and 0 to 30 mass % is particularly preferable.

the (b-1) specific polymer relating to the present invention may adopt various kinds of polymer structures such as polyurethanes, polyesters, or polyethyleneimines besides the vinyl polymer described above; however, the vinyl polymer is preferable from the viewpoint of discharging properties of the ink composition and suitable preparation properties.

The (b-1) specific polymer relating to the present invention may be obtained by polymerizing the monomer represented by the General Formula (2') and the monomer which is used as demanded represented by the General Formula (3') using well-known methods, and neutralizing the acidic group by an alkali metal hydroxide or the like as needed. For example, the polymer may be obtained from methods in accordance with polymerization methods disclosed in JP1977-988A (JP-S52-988A), JP1980-154970A (JP-S55-154970A), and Langmuir, Volume 18, Number 14, pages 5414 to 5421 (2002).

In the (b-1) specific polymer which composes the particles of (b) the polymer compound, a molecular weight (a weight average molecular weight for those having a molecular weight distribution) of 2,000 to 100,000 is preferable, a weight average molecular weight of 2,000 to 80,000 is more preferable, and 3,000 to 50,000 is particularly preferable.

Also, a weight average molecular weight is measured using Gel Permeation Chromatography (GPC). As a GPC, HLC-8020 GPC (manufactured by Tosoh Co., Ltd.) is used, for columns, TSKgel Super HZM-H, TSKgel Super HZ4000, TSKgel Super HZ200 (manufactured by Tosoh Co., Ltd., 4.6 mm ID×15 cm) are used, and as an eluent, THF (tetrahydrofuran) is used.

Hereinafter, example compound (P-1) to example compound (P-10) are described as specific examples, however, the present invention is not limited to these.

[Chem. 19]

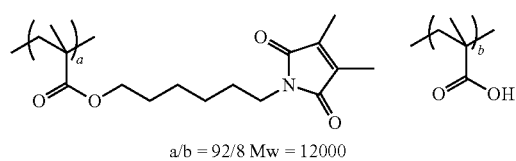

P-1 a/b = 92/8 Mw = 12000

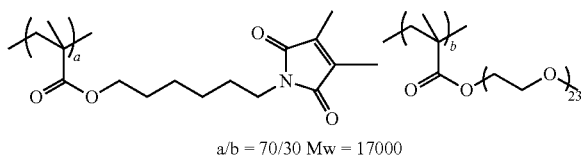

P-2 a/b = 70/30 Mw = 17000

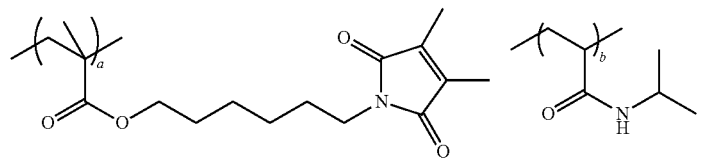

P-3 a/b = 50/50 Mw = 22000

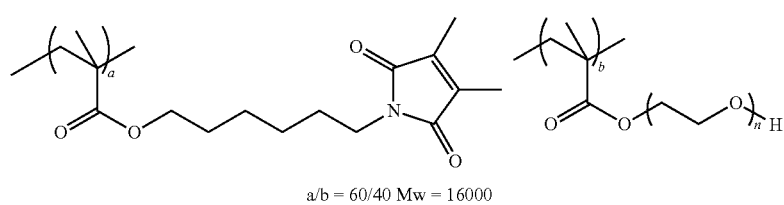

P-4 a/b = 60/40 Mw = 16000

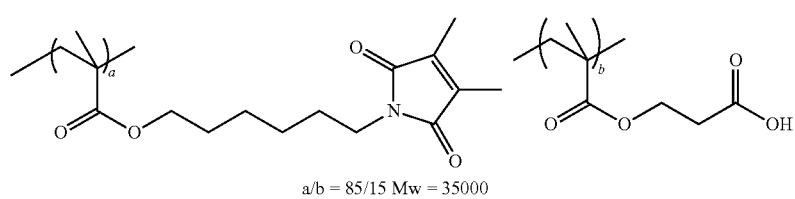

P-5 a/b = 85/15 Mw = 35000

[Chem. 20]

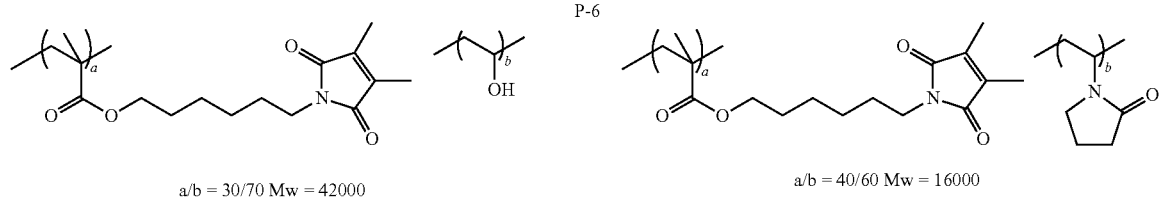

P-6 a/b = 30/70 Mw = 42000

P-7 a/b = 40/60 Mw = 16000

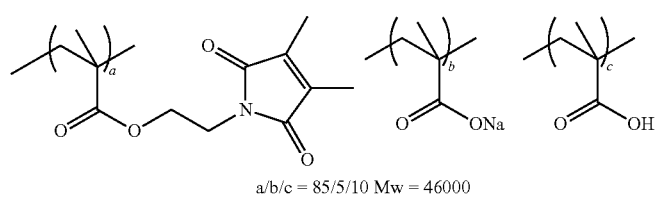

P-8 a/b/c = 85/5/10 Mw = 46000

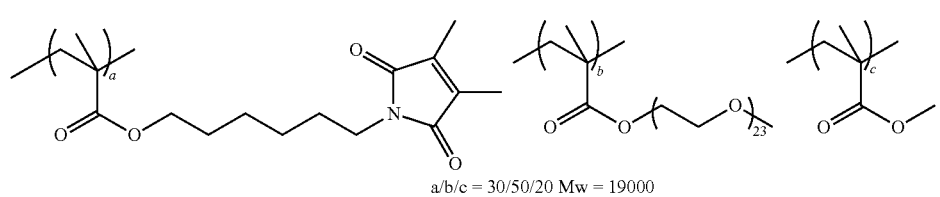

P-9 a/b/c = 30/50/20 Mw = 19000

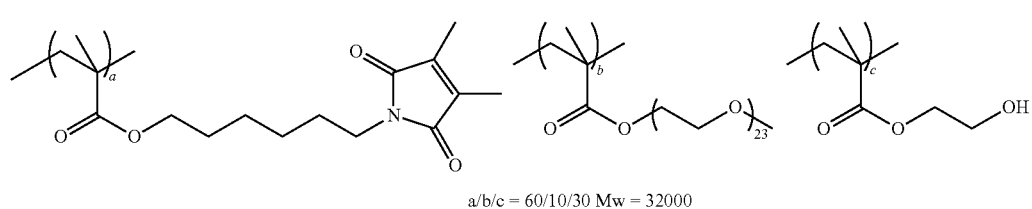

P-10 a/b/c = 60/10/30 Mw = 32000

[Preparation Method of Particles of (b) Polymer Compound]

The (b-1) specific polymer including the repeating unit having the partial structure represented by the General Formula (1) is a main component of the particles of (b) the polymer compound according to the present invention, and is included in the ink composition dispersed in the dispersion medium containing (a) the water (the aqueous medium).

As the preparation method of the particles of (b) the polymer compound, specifically, for example, a method (emulsion dispersion method) in which water-dispersible particles prepared in advance are dispersed as an emulsion using well-known methods such as a phase-transfer emulsification method or a method in which the polymer compound is synthesized in a dispersed form by an emulsion polymerization method may be used.

Of these, as the preparation method of the particles of (b) the polymer compound, the emulsion dispersion method is preferable. As the emulsion dispersion method, there is a method in which, through one of the processes in which water is added to an organic solvent containing the polymer including the repeating unit having the partial structure represented by the General Formula (1) and the organic solvent is added to water, the organic solvent is emulsified and becomes particles. That is, a method of preparing a dispersion in a manner that, after the first step in which a solution of the (b-1) specific polymer dissolved in an organic solvent is prepared, the polymer solution obtained and the solution containing at least water are mixed, is preferably used.

As a state of dispersion, any of the following, such as the (b-1) specific polymer being emulsified in an aqueous medium, being emulsion polymerized, being micelle dispersed, or the molecular chain itself being dispersed in a molecular form having a partial hydrophilic structure in the molecule, may be used.

The volume average particle diameter of the particles of (b) the polymer compound is preferably 20 to 300 nm, more preferably 30 to 250 nm, particularly preferably 30 to 200 nm. Regarding the particle size distribution, there is no particular limitation, and the particles may have a wide particle size distribution, or may have a particle size distribution of monodispersion. The particle size and the particle size distribution may be prepared by means such as centrifugation or filtration.

As the content of (b) the polymer particles in the ink composition, 2 to 15 mass % is preferable, 2 to 12 mass % is more preferable, and 2 to 10 mass % is even more preferable.

[(a) Water]

The ink composition of the present invention contains water.

As (a) the water, it is preferable that ion-exchanged water without impurities or distilled water be used.

As the content of the water in the ink composition of the present invention, 10 to 97 mass % is preferable, 30 to 95 mass % is more preferable, and 50 to 85 mass % is even more preferable.

[Other Additives]

In the ink composition of the present invention, well-known additives may be used in combination, in addition to the particles of (b) the compound and (a) the water which are essential components, as long as effects of the present invention are not impaired.

[(c) Polymerizable Compound]

The ink composition of the present invention may contain a polymerizable compound having a different structure from that of the (b-1) specific polymer. Including the polymerizable compound improves a curing property of the ink composition and further improves a fixability of the formed image from the ink composition to the recording medium and solvent resistance of the image.

The polymerizable compound may be any compound as long as it is a water-soluble compound having at least one of either a radical polymerizable ethylenic unsaturated bond or the partial structure represented by the following General Formula (1) in the molecule, and both polymerizable low-molecular compounds with a molecular weight of greater than or equal to 100 and less than 1,000 and polymerizable polymer compounds with a molecular weight of greater than or equal to 1,000 and less than 50,000 may be used.

The polymerizable compound may use only one of each polymerizable low-molecular compound or polymerizable polymer compound, or use a combination of two or more at an arbitrary ratio in order to improve the characteristics aimed for or use both a polymerizable low-molecular compound and a polymerizable polymer compound. Preferably, using two or more as a combination is preferable. A molecular weight (a weight average molecular weight for those having a molecular weight distribution) of the polymerizable polymer compound is measured using Gel Permeation Chromatography (GPC) under the same measuring conditions of the weight average molecular weight of the (b-1) specific compound.

The polymerizable compound used in the present invention needs to be a water-soluble compound or a water-dispersible compound, and the water-soluble or water-dispersible compound according to the present invention indicates that the compound dissolves at 2 mass % in distilled water or the compound uniformly disperses so that the presence of solids cannot be confirmed visually. However, it is preferable that the compound dissolve or disperse at 15 mass % and it is particularly preferable that the compound uniformly mixes with water at an arbitrary ratio.

As one example of the low-molecular polymerizable compound, an unsaturated carboxylic acid such as acrylic acid, methacrylic acid, itaconic acid, crotonic acid, isocrotonic acid, or maleic acid, an unsaturated carboxylate and salts thereof; an anhydride having an ethylenic unsaturated group; (meth)acrylamide; a styrene derivative; vinyl ethers, an N-vinyl compound or the like may be included.

As the radical polymerizable compound, in particular, a radical polymerizable monofunctional monomer and a radical polymerizable polyfunctional monomer may be included.

As the radical polymerizable monofunctional monomer, for example, acrylamide, 2-hydroxyethyl acrylamide, 2-hydroxymethyl acrylamide, t-butyl acrylamide, 3-dimethylaminopropyl acrylamide, 2-hydroxyethyl vinyl ether, 4-hydroxybutyl vinyl ether, methoxyoligo ethylene glycol (meth)acrylate, methoxy polyethylene glycol (metha)acrylate, polyethylene glycol (meth)acrylate, tetrahydrofurfuryl acrylate, 2-hydroxyethyl (meth)acrylate, 2-hydroxypropyl (meth)acrylate or the like may be included.

As the radical polymerizable polyfunctional monomer, for example, oligoethylene glycol di(meth)acrylate, polyethylene glycol di(meth)acrylate, bis[2-(methacryloyloxy)ethyl] phosphate, methylene bisacrylate, 4,7,10-trioxa-1,13-tridecane bisacrylamide, triethylene glycol divinyl ether, acrylamides disclosed in JP2005-307198A and JP2007-277380A or the like may be included.

Also, as (c) the polymerizable compound used in the present invention besides the above, a radical polymerizable polyfunctional monomer disclosed in JP2005-307198A, JP2007-277380A shown below may also be included. However, the present invention is not limited to these.

As the radical polymerizable oligomer, a polyester oligomer, a urethane oligomer, a modified polyether oligomer, an acrylic oligomer, an epoxy oligomer or the like may be used. Among these, from the viewpoint of hydrolytic stability, an oligomer having an acrylamide group as the polymerizable group or a water-dispersible urethane oligomer is more preferable.

In addition, a low molecular compound having the partial structure represented by the General Formula (1) may also be used as the polymerizable compound.

As the polymerizable low-molecular compound described above, a compound having 2 to 6 partial structures represented by the General Formula (1) in one molecule is preferable, a compound having 2 to 4 is more preferable, a compound having 2 to 3 is even more preferable, and a compound having 2 is particularly preferable.

More specifically, a compound represented by the following General Formula (1-L) may be included.

[Chem. 21]

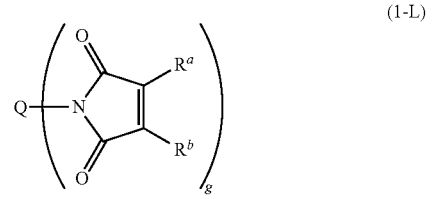

(1-L)

In the General Formula (1-L), $R^a$ and $R^b$, each independently, represent an alkyl group having the number of carbon atoms 1 to 4 and $R^a$ and $R^b$ may be bonded to each other to form an alicyclic structure with a 4- to 6-membered ring. Q represents a linking group with a valence number of g. g represents an integer of two or more.

$R^a$ and $R^b$ in the Formula (1-L) are the same as $R^a$ and $R^b$ in the General Formula (1) described above, respectively, and so are the preferable examples.

In the Formula (1-L), Q represents the linking group with a valence number of g. Q is preferably a residue in which g numbers of hydrogen atoms are removed from a hydrocarbon group. When Q is a hydrocarbon group, an ether group, an ester group, an amino group, an amide bond, a silyl ether group, and a thiol group may exist in the hydrocarbon group. When Q is a hydrocarbon group, a hydrocarbon group having the number of carbon atoms 1 to 30 is preferable, and a hydrocarbon group having the number of carbon atoms 1 to 20 is more preferable.

In the Formula (1-L), g represents an integer of two or more. An integer of 2 to 6 is preferable, 2 to 4 is more preferable, 2 to 3 is even more preferable, and 2 is particularly preferable.

As specific examples of the compounds represented by the General Formula (1-L), following compounds (4-1) to (4-6) may be preferably included.

[Chem. 22]

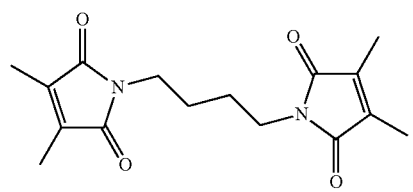

(4-1)

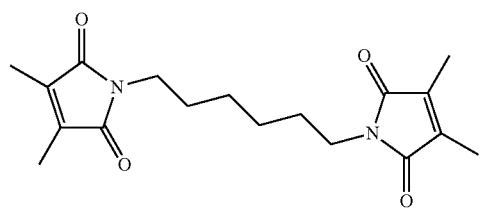

(4-2)

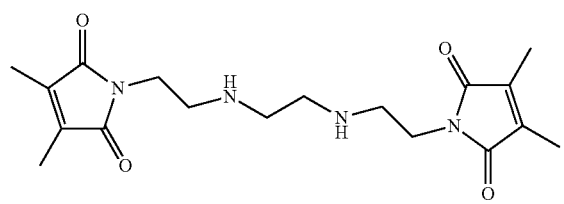

(4-3)

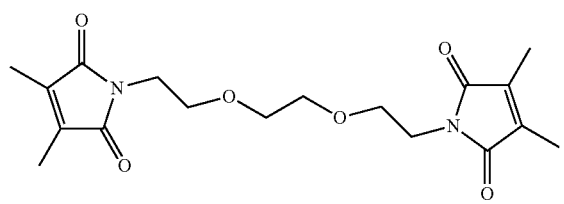

(4-4)

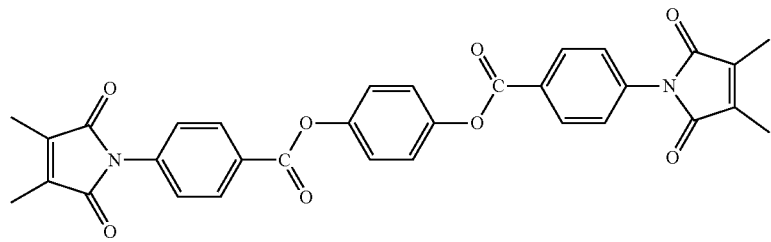

(4-5)

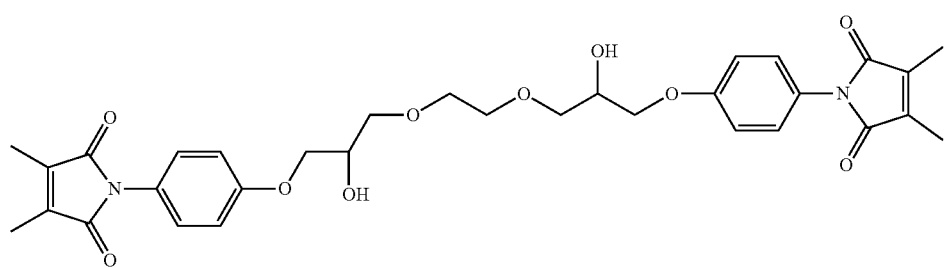

(4-6)

Also, as the compounds having the monofunctional structure of the General Formula (1), for example, following compounds (4-7) to (4-9) may be included.

[Chem. 23]

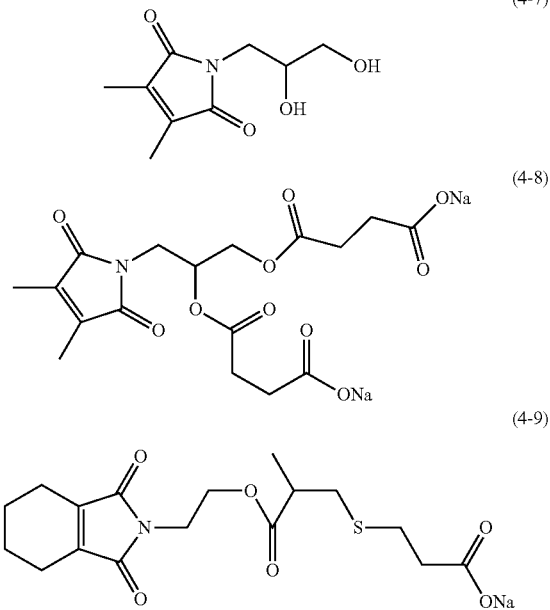

As the polymerizable polymer compound, a polymer compound having a (meth)acryloyl group, a (meth)acrylamide group, a maleimidyl group, a styryl group, a vinyl ether group, an allyl group or the partial structure represented by the General Formula (1) may be included. Among these, a water-soluble polymer compound having the partial structure represented by the General Formula (1) used in combination is preferable.

As the content of the water-soluble polymerizable compound in the ink composition, 0 to 30 mass % is preferable, 0 to 20 mass % is more preferable, and 0 to 10 mass % is even more preferable. By adjusting the content within this range, fixability or a discharging property and smoothness of the ink cured film tend to be favorable.

[Other Additives]

(f) Photopolymerization Initiator

The aqueous ink composition of the present invention may contain a polymerization initiator within the range that effects of the present invention are not impaired. In particular, when the aqueous ink composition contains the radical polymerizable compound as the polymerizable compound, including the polymerization initiator is preferable from a viewpoint of the improvement of curability.

The polymerization initiator used in the present invention is preferably water-soluble, and as the degree of water-solubility, it is preferable that greater than or equal to 0.5 mass % dissolves in distilled water at 25° C., more preferable that greater than or equal to 1 mass % dissolves, and particularly preferable that greater than or equal to 3 mass % dissolves. Also, as a photopolymerization initiator, a photopolymerization initiator in which the non-water-soluble polymerization initiator is dispersed may be used.

In the present invention, it is preferable that the polymerization initiator selected from the group consisting of α-hydroxy ketones, α-amino ketones, and acyl phosphine oxides be used. As a commercially-available polymerization initiator, a water-soluble photopolymerization initiator such as 1-[4-(2-hydroxyethyl)-phenyl]-2-hydroxy-2-methyl]-1-propan-1-one, 1-hydroxycyclohexylphenyl ketone, or 2-hydroxy-2-methyl-1-phenyl propan-1-one, or a hydrophobic photopolymerization initiator such as an aqueous dispersion of [bis(2,4,6-trimethylbenzoyl)-phenyl phosphine oxide] may be used.

(e) Water-Soluble Organic Solvent

The aqueous ink composition of the present invention may contain water as a main solvent (dispersion medium), however, it is preferable that a water-soluble organic solvent be further included in combination in the solvent.

Here, the water-soluble organic solvent is a solvent of which a solubility is greater than or equal to 10 mass % in water at 25° C.

The water-soluble organic solvent which may be used in the present invention is, for example, as follows:

Alcohols (for example, methanol, ethanol, propanol, isopropanol, butanol, isobutanol, secondary butanol, tertiary butanol, pentanol, hexanol, cyclohexanol, benzyl alcohol or the like);

polyvalent alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, or thiodiglycol, 2-methylpropanediol, or the like);

polyvalent alcohol ethers (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, propylene glycol monophenyl ether, or the like);

amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine, or the like);

amides (for example, formamide, N,N-dimethylformamide, N,N-dimethylacetamide, or the like);

heterocyclics (for example, 2-pyrrolidone, N-methyl-2-pyrrolidone, cyclohexylpyrrolidone, 2-oxazolidone, 1,3-dimethyl-2-imidazolidinone, γ-butyrolactone, propylene carbonate, ethylene carbonate, ethylene urea, or the like);

sulfoxides (for example, dimethylsulfoxide, or the like);

sulfones (for example, sulfolane, or the like)

others (urea, acetonitrile, acetone, or the like).

As the preferable water-soluble organic solvent, the polyvalent alcohol ethers or the heterocyclic compounds may be included, and it is preferable that these are used in combination. Among the polyvalent alcohol ethers, so-called glycol ethers are preferable, specifically, tripropylene glycol monomethyl ether, dipropylene glycol monomethyl ether, or dipropylene glycol dimethyl ether is preferable, and 2-dipropylene glycol monomethyl ether is more preferable. As the heterocyclic compounds, 2-pyrrolidone, γ-butyrolactone, propylene carbonate, ethylene urea, or the like, is preferable, and 2-pyrrolidone or γ-butyrolactone is particularly preferable. In particular, a solvent with high boiling point is preferably used and a boiling point of greater than or equal to 120° C. at atmospheric pressure is preferable, and greater than or equal to 150° C. is more preferable.

The water-soluble organic solvent may be used alone or as a combination of two or more. An added amount of the water-soluble organic solvent in the ink composition is 1 to 60 mass % as the total amount and preferably 2 to 35 mass %.

(d) Coloring Agent: Pigment Dispersion

The ink composition of the present invention becomes a colored ink composition due to a pigment dispersion as a coloring agent being included. Using the pigment dispersion as a coloring agent is preferable from a viewpoint of solvent-resistance improvement. As the pigment dispersion, besides the substance in which a pigment is dispersed using a pigment dispersing agent, a self-dispersing pigment may also be used.

(Pigment)

As a pigment which may be included in the pigment dispersion in the ink composition, generally used organic pigments, inorganic pigments, or also a pigment in which resin particles are dyed with a dye may be used. All commercially available pigments may be used, or pigments which are treated in advance with a commercially available pigment dispersing agent or a surface treating agent, for example, a pigment which is dispersed by a non-water-soluble resin as the dispersion medium, or a pigment of which a surface is grafted with a resin, may also be used as long as the effects of the present invention are not impaired.

As these pigments, for example, pigments disclosed in "Encyclopedia of Pigments" edited by Ito Seishiro (published in 2000), "Industrial Organic Pigments" by W. Herbst, K. Hunger, JP2002-12607A, JP2002-188025A, JP2003-26978A, or JP2003-342503, may be included.

As the organic pigment and inorganic pigment which may be used in the present invention, for example, as pigments which exhibit yellow color, a monoazo pigment such as C. I. Pigment Yellow 1 (First Yellow G or the like) or C. I. Pigment Yellow 74; a disazo pigment such as C. I. Pigment Yellow 12 (disazo yellow or the like), C. I. Pigment Yellow 17, C. I. Pigment Yellow 97, C. I. Pigment Yellow 3, C. I. Pigment Yellow 16, C. I. Pigment Yellow 83, C. I. Pigment Yellow 155, or C. I. Pigment Yellow 219; an azo lake pigment such as C. I. Pigment Yellow 100 (tartrazine yellow lake); a condensed azo pigment such as C. I. Pigment Yellow 95 (condensed azo yellow or the like), C. I. Pigment Yellow 93, C. I. Pigment Yellow 94, C. I. Pigment Yellow 128, or C. I. Pigment Yellow 166; an acidic dye lake pigment such as C. I. Pigment Yellow 115 (quinoline yellow lake or the like); a basic dye lake pigment such as C. I. Pigment Yellow 18 (thioflavin lake or the like); an anthraqinone-based pigment such as flavanthrone yellow pigments (Y-24); an isoindolinone pigment such as isoindolinone yellow 3RLT (Y-110); a quinophthalone pigment such as quinophthalone yellow (Y-138); an isoindoline pigment such as isoindoline yellow (Y-139); a nitroso pigment such as C. I. Pigment Yellow 153 (nickel nitroso yellow or the like); an azomethine metal complex salt pigment such as C. I. Pigment Yellow 117 (copper azomethine yellow or the like); an acetolone pigment such as C. I. Pigment Yellow 120 (benzimidazolone yellow), C. I. Pigment Yellow 151, C. I. Pigment Yellow 175, C. I. Pigment Yellow 180, C. I. Pigment Yellow 181, or C. I. Pigment Yellow 194; or the like may be included.

As pigments which exhibit red or magenta color, for example, a monoazo pigment such as C. I. Pigment Red 3 (toluidine red or the like); a B-naphthol pigment such as C. I. Pigment Red 1, C. I. Pigment Red 4, or C. I. Pigment Red 6; a disazo pigment such as C. I. Pigment Red 38 (pyrazolone red B or the like); an azo lake pigment such as C. I. Pigment Red 53:1 (lake red C or the like) or C. I. Pigment Red 57:1 (brilliant carmine 6B or the like), C. I. Pigment Red 52:1, or C. I. Pigment Red 48 (B-oxynaphthoic acid lake); a condensed azo pigment such as C. I. Pigment Red 144 (condensed azo red or the like), C. I. Pigment Red 166, C. I. Pigment Red 220, C. I. Pigment Red 214, C. I. Pigment Red 221, or C. I. Pigment Red 242; an acidic dye lake pigment such as C. I. Pigment Red 174 (phloxin B lake or the like) or C. I. Pigment Red 172 (erythrosine lake or the like); a basic dye lake pigment such as C. I. Pigment Red 81 (rhodamine 6G' lake or the like); an anthraqinone-based pigment such as C. I. Pigment Red 177 (dianthraquinonyl red or the like); a thio indigo pigment such as C. I. Pigment Red 88 (thio indigo bordeaux or the like); a perinone pigment such as C. I. Pigment Red 194 (perinone red or the like); or the like may be included.

A perylene pigment such as C. I. Pigment Red 149 (perylene scarlet or the like), C. I. Pigment Red 179, C. I. Pigment Red 178, C. I. Pigment Red 190, C. I. Pigment Red 224, or C. I. Pigment Red 123; a quinacridone pigment such as C. I. Pigment Violet 19 (unsubstituted quinacridone), C. I. Pigment Red 122 (quinacridone magenta or the like), C. I. Pigment Red 262, C. I. Pigment Red 207, or C. I. Pigment Red 209; an isoindolinone pigment such as C. I. Pigment Red 180 (isoindolinone red 2BLT or the like); an alizarin lake pigment such as C. I. Pigment Red 83 (madder lake or the like); a naphthone pigment such as C. I. Pigment Red 171, C. I. Pigment Red 175, C. I. Pigment Red 176, C. I. Pigment Red 185, or C. I. Pigment Red 208; a naphthol AS-based lake pigment such as C. I. Pigment Red 247; a naphthol AS lake pigment such as C. I. Pigment Red 2, C. I. Pigment Red 5, C. I. Pigment Red 21, C. I. Pigment Red 170, C. I. Pigment Red 187, C. I. Pigment Red 256, C. I. Pigment Red 268, or C. I. Pigment Red 269; a diketopyrrolopyrrole pigment such as C. I. Pigment Red 254, C. I. Pigment Red 255, C. I. Pigment Red 264, or C. I. Pigment Red 27; or the like may be included.

As pigments which exhibit blue or cyan color, for example, a disazo pigment such as C. I. Pigment Blue 25 (dianisidine blue or the like); a phthalocyanine pigment such as C. I. Pigment Blue 15, C. I. Pigment Blue 15:1, C. I. Pigment Blue 15:2, C. I. Pigment Blue 15:3, C. I. Pigment Blue 15:4, C. I. Pigment Blue 15:6, or C. I. Pigment Blue 16 (phthalocyanine blue or the like); an acidic dye lake pigment such as C. I. Pigment Blue 24 (peacock blue lake or the like); a basic dye lake pigment such as C. I. Pigment Blue 1 (Victoria pure blue BO lake or the like); an anthraquinone-based pigment such as C. I. Pigment Blue 60 (indanthrone blue or the like); an alkali blue pigment such as C. I. Pigment Blue 18 (alkali blue V-5:1); or the like may be included.

As pigments which exhibit green color, for example, a phthalocyanine pigment such as C. I. Pigment Green 7 (phthalocyanine green) or C. I. Pigment Green 36 (phthalocyanine green); an azo metal complex pigment such as C. I. Pigment Green 8 (nitroso green) or C. I. Pigment Green 10; or the like may be included.

As pigments which exhibit orange color, for example, an isoindoline pigment such as C. I. Pigment Orange 66 (isoindoline orange); an anthraquinone-based pigment such as C. I. Pigment Orange 51 (dichloropyranthrone orange); a B-naphthol pigment such as C. I. Pigment Orange 2, C. I. Pigment Orange 3, or C. I. Pigment Orange 5; a naphthol AS pigment such as C. I. Pigment Orange 4, C. I. Pigment Orange 22, C. I. Pigment Orange 24, C. I. Pigment Orange 38, or C. I. Pigment Orange 74; an isoindolinone pigment such as C. I. Pigment Orange 61; a perinone pigment such as C. I. Pigment Orange 43; a disazo pigment such as C. I. Pigment Orange 15 or C. I. Pigment Orange 16; a quinacridone pigment such C. I. Pigment Orange 48 or C. I. Pigment Orange 49; an acetolone pigment such as C. I. Pigment Orange 36, C. I. Pigment Orange 62, C. I. Pigment Orange 60, C. I. Pigment Orange 64, or C. I. Pigment Orange 72; a pyrazolone pigment such as C. I. Pigment Orange 13 or C. I. Pigment Orange 34; may be included.

As pigments which exhibit brown color, for example, a naphthrone pigment such as C. I. Pigment Brown 25 or C. I. Pigment Brown 32 may be included.

As pigments which exhibit black color, for example, an indazine pigment such as carbon black, titanium black, or C. I. Pigment Black 1 (aniline black); a perylene pigment such as C. I. Pigment Black 31 or C. I. Pigment Black 32; or the like may be included.

As white pigments, for example, basic lead carbonate ($2PbCO_3Pb(OH)_2$, so-called silver white), zinc oxide (ZnO, so-called zinc white), titanium oxide ($TiO_2$, so-called titanium white), strontium titanate ($SrTiO_3$, so-called titanium strontium white) or the like may be used. The inorganic particles used in the white pigment can be a simple substance or composite particles with, for example, an oxide of silicon, aluminum, zirconium, or titanium or the like, an organic metal compound, or an organic compound.

Here, since titanium oxide has a low specific gravity compared to other white pigments, large refractive index, and is chemically and physically stable, masking abilities or tinting power is large as a pigment, and also resistance to acids, alkalis, and other environments is also excellent. Therefore, as the white pigment, titanium oxide is preferably used. Naturally, other white pigments (including pigments besides the white pigments listed above) may be used as necessary.

As pigments other than white, since the smaller the average particle diameter, the better the color developing property is, if the pigment dispersion relating to the present invention is applied as a pigment dispersion other than white, the average particle diameter of the pigment contained in the pigment dispersion is preferably approximately 0.01 µm to 0.4 µm and more preferably within the range of 0.02 µm to 0.3 µm. Also, the maximum particle diameter of the pigment is less than or equal to 3 µm preferably less than or equal to 1 µm. The particle diameter of the pigment may be adjusted by the pigment, the dispersing agent, choice of the dispersing agent, dispersing condition, choice of the filtering condition or the like. Also, if the pigment dispersion of the present invention is prepared as the white pigment dispersion applicable to the white ink composition or the like, the average particle diameter of the pigment contained in the pigment dispersion is, from the viewpoint of sufficient masking property, preferably approximately 0.05 µm to 1.0 µm more preferably within the range of approximately 0.1 µm to 0.4 µm. Even in a case in which the pigment dispersion is applied as a white pigment dispersion, the maximum particle diameter of the pigment is less than or equal to 3 µm preferably less than or equal to 1 µm.

(Dispersing Agent)

If the pigment is used as the coloring agent, the pigment dispersing agent may be used as necessary when pigment particles are prepared, and as the pigment dispersing agent which may be used, for example, an active agent such as a higher fatty acid salt, an alkyl sulfate salt, an alkyl ester sulfate salt, an alkyl sulfonate salt, a sulfosuccinate salt, a naphthalene sulfonate salt, an alkyl phosphate salt, a polyoxyalkylene alkyl ether phosphate, a polyoxyalkylene alkylphenyl ether, a polyoxyalkylene polyoxypropylene glycol, a glycerine ester, a sorbitan ester, a polyoxyethylene fatty acid amide, an amine oxide or the like, or a block copolymer, a random copolymer and salts thereof composed of two or more types of monomers selected from styrene, a styrene derivative, a vinylnaphthalene derivative, acrylic acid, an acrylic acid derivative, maleic acid, a maleic acid derivative, itaconic acid, an itaconic acid derivative, fumaric acid, and a fumaric acid derivative may be included.

Also, in the ink composition of the present invention, the self-dispersing pigment may be used. The self-dispersing pigment referred to in the present invention indicates a pigment which can be dispersed without a dispersing agent, and particularly preferably pigment particles having a polar group on the surface.

The pigment particles having a polar group on the surface referred to in the present invention indicate pigments modified directly on the surface of the pigment particles with the polar group, or a pigment in which the polar group is bonded either directly or through a join with an organic substance having an organic pigment mother nucleus (hereinafter, referred to as the pigment derivative).

As the polar group, for example, a sulfonate group (also referred to as a sulfo group, a carboxylate group (also referred to as a carboxyl group), a phosphate group (also referred to as a phospho group), a borate group, or a hydroxyl group may be included. However, a sulfonate group or a carboxylate group is preferable, and a sulfonate group is more preferable.

As a method in which the pigment particles having a polar group on the surface are obtained, for example, a method in which the polar group such as the sulfonate group or the salt thereof is introduced to at least part of the surface of the pigment by oxidizing the surface of the pigment particles with suitable oxidizing agents is disclosed in WO97/48769A, JP1998-110129A (JP-H10-110129A), JP1999-246807A (JP-H11-246807A), JP1999-57458A (JP-H11-57458A), JP1999-189739A (JP-H11-189739A), JP1999-323232A (JP-H11-323232A), JP2000-265094A or the like. Specifically, preparation can be by oxidizing the carbon black with concentrated nitric acid or, for color pigments, by oxidizing with sulfamic acid, a sulfonated pyridine salt, amidosulfuric acid or the like in sulfolane or N-methyl-2-pyrrolidone. From these reactions, the pigment dispersing agent may be obtained by removing components which becomes water-soluble from the oxidation having proceeded too far and purifying. Also, if the sulfonate group is introduced on the surface by oxidation, the acidic group may be neutralized using a basic compound as necessary.

Other methods by which the pigment particles having a polar group on the surface are obtained include methods in which the pigment derivative is adsorbed to the surface of the pigment particles by a treatment such as milling, disclosed in JP1999-49974A (JP-H11-49974A), JP2000-273383A, JP2000-303014A or the like, or in which the pigment particles are crystallized in a poor solvent after the pigment is dissolved in a solvent with the pigment derivative, disclosed in JP2000-377068A, JP2001-1495A, JP2001-234996A. The pigment particles having a polar group on the surface can be readily obtained by either method.

The polar group on the pigment surface may be in a free state, or in a salt state, or have a salt counterion. As the salt counterion, for example, an inorganic salt (lithium, sodium, potassium, magnesium, calcium, aluminum, nickel, ammonium), an organic salt (triethylammonium, diethylammonium, pyridinium, triethanol ammonium or the like) may be included and the counter salt having a valence number of 1 is preferable.

(g) Surfactant

A surfactant may be added to the ink composition of the present invention. As the surfactant preferably used, anionic surfactants such as dialkyl sulfosuccinate salts, alkylnaphthalene sulfonate salts, or fatty acids salts, nonionic surfactants such as polyoxyethylene alkyl ethers, polyoxyethylene alkyl allyl ethers, acetylene glycols, or polyoxyethylene-polyoxypropylene block copolymers, cationic surfactants such as alkyl amine salts or quaternary ammonium salts, may be included. In particular, anionic surfactants and nonionic surfactants may be preferably used.

Also, according to the present invention, a polymeric surfactant may be used and following water-soluble resins may be included as preferable polymeric surfactants. As the water-soluble resin preferably used, a styrene-acrylic acid-alkyl acrylate copolymer, a styrene-acrylic acid copolymer, a styrene maleic acid-alkyl acrylate copolymer, a styrene maleic acid copolymer, a styrene-methacrylic acid-alkyl acrylate copolymer, a styrene-methacrylic acid copolymer, a styrene maleic acid half ester copolymer, a vinylnaphthalene-acrylic acid copolymer, a vinylnaphthalene maleic acid copolymer may be included.

When a latex is used in the ink composition of the present invention, it is preferable that the added amount of the latex be greater than or equal to 0.1 mass % and less than or equal to 20 mass % as the added amount of solid, and it is particularly preferable that the added amount of the latex be greater than or equal to 0.5 mass % and less than or equal to 10 mass % as the added amount of solid.

(h) Aqueous Polymer

An aqueous polymer having a different structure from that of the (b-1) specific polymer may be added to the ink composition of the present invention. As preferable examples of the aqueous polymer, proteins such as gelatin, casein, or albumin; natural rubbers such as gum arabic or gum tragacanth; glucosides such as saponin; an alginic acid derivative such as alginic acid and propylene glycol alginate, triethanolamine alginate, or ammonium alginate; a cellulose derivative such as methyl cellulose, carboxymethyl cellulose, hydroxyethyl cellulose, or ethylhydroxyl cellulose; polyvinyl alcohols; polyvinylpyrrolidone; an acryl-based resin such as polyacrylic acid, an acrylic acid-acrylonitrile copolymer, a potassium acrylate-acrylonitrile copolymer, a vinyl acetate-acrylate copolymer or an acrylic acid-acrylate; a styrene-acrylate resin such as a styrene-acrylic acid copolymer, a styrene-methacrylic acid copolymer, a styrene-methacrylic acid-acrylate copolymer, a styrene-α-methylstyrene-acrylic acid copolymer, or a styrene-α-methylstyrene-acrylic acid-acrylate copolymer; a styrene-maleic acid copolymer, a styrene-maleic anhydride copolymer, a vinyl naphthalene-acrylic acid copolymer, a vinyl naphthalene-maleic acid copolymer, and a vinyl acetate-based copolymer and salts thereof such as a vinyl acetate-ethylene copolymer, a vinyl acetate-vinyl fatty acid-ethylene copolymer, a vinyl acetate-maleate copolymer, a vinyl acetate-crotonic acid copolymer, or a vinyl acetate-acrylic acid copolymer may be included.

(i) Sensitizing Dye

In the present invention, well-known sensitizing dyes may be used in combination and it is preferable that the sensitizing dyes be used in combination. Regarding solubility, it is preferable that greater than or equal to 0.5 mass % dissolves in distilled water at room temperature, more preferable that greater than or equal to 1 mass % dissolves, and particularly preferable that greater than or equal to 3 mass % dissolves. Also, as the sensitizing dye, the photopolymerization initiator in which the non-water-soluble polymerization initiator is dispersed, may be used.

As examples of the well-known sensitizing dyes which may be used in combination, N-[2-hydroxy-3-(3,4-dimethyl-9-oxo-9H-thioxanthen-2-yloxy)propyl]-N,N,N-trimethylaluminum chloride, benzophenone, thioxanthone, an anthraquinone derivative and a 3-acylcoumarin derivative, terphenyl, styryl ketone and 3-aroylmethylene thiazoline, camphorquinone, eosin, rhodamine, and erythrosine, or modified compounds thereof modified to be water-soluble or dispersed compounds thereof may be included. Also, the compound represented by the General Formula (1) disclosed in JP2010-24276A or the compound represented by the Formula (1) disclosed in JP1994-107718A (JP-H6-107718A) may be suitably used.

Various well-known additives may be appropriately selected and used for the ink relating to the present invention, in addition to each component described above, as necessary for the purpose of discharging stability, suitability with a print head or ink cartridge, preservation stability, image preserving property, or other various performance improvements. As well-known additives, for example, a viscosity adjusting agent, a surface tension adjusting agent, a specific resistance adjusting agent, a film forming agent, a dispersing agent, a surfactant, an ultraviolet ray absorbent, an antioxidant, an anti-fading agent, a fungicide, an anti-rust additive, a solid wetting agent, silica fine particles or the like may be appropriately selected and used, and for example, fine oil droplets such as liquid paraffin, dioctylphthalate, or tricresyl phosphate, silicon oil, ultraviolet ray absorbents disclosed in JP1982-74193A (JP-S57-74193A), JP1982-87988A (JP-S57-87988A), and JP1987-261476A (JP-S62-261476A), anti-fading agents disclosed in JP1982-74192A (JP-S57-74192A), JP1982-87989A (JP-S57-87989A), JP1985-72785A (JP-S60-72785A), JP1986-146591A (JP-S61-146591A), JP1989-95091A (JP-H1-95091A), and JP1991-13376A (JP-H3-13376A), fluorescence brightening agents disclosed in JP1984-42993A (JP-S59-42993A), JP1984-52689 (JP-S59-52689A), JP1987-280069 (JP-S62-280069A), JP1986-242871 (JP-S61-242871A), and JP1992-219266A (JP-H4-219266A), pH adjusting agents such as sulfuric acid, phosphoric acid, citric acid, sodium hydroxide, potassium hydroxide, and potassium carbonate may be included.

<Preparation Method of the Ink Composition>

A preparation method of the ink composition relating to the present invention is not particularly limited, and the ink composition may be prepared by stirring, mixing, and dispersing each component by a simple dispersing group using a container driven media mill such as a ball mill, a centrifugal mill, or a planetary ball mill, a high-speed rotation mill such as a sand mill, a media agitating mill such as an agitating tank mill, a dispermill or the like. The addition order of each component is arbitrary. Preferably, the azo pigment, the polymer dispersing agent and the organic solvent are pre-mixed and then dispersed, and the dispersions obtained are mixed together with the resin and the organic solvent. In this case, the mixture is mixed uniformly in a stirring machine such as a Three-One Motor, a magnetic stirrer, a dispermill, or a homogenizer at the time of or after the addition. A mixing machine such as a line mixer may be used for mixing. Also, a dispersing machine such as a bead mill or high-pressure injection mill may be used for mixing to make the dispersed particles finer. Also, depending on the types of pigments or polymer dispersing agents, the resin may be added at the time of pre-mixing before pigment dispersion.

In the ink composition of the present invention, a surface tension at 25° C. is preferably 20 to 40 mN/m. The surface tension is measured using an Automatic Surface Tensiometer CBVP-Z (manufactured by Kyowa Interface Science Co., Ltd.) at 25° C. Also, a viscosity is preferably 1 to 40 mPa·s and more preferably 3 to 30 mPa·s. The viscosity of the ink composition is measured using a VISCOMETER TV-22 (manufactured by TOKI SANGYO CO., LTD.) at 25° C.

The inventors of the present invention found that, by including the particles of (b) the polymer compound and (a) the water, the effects of the present invention may be obtained. Although this mechanism has not been elucidated, the inventors of the present invention infer as follows.

That is, it is considered that the (b-1) specific polymer which composes the particles of (b) the polymer compound increases a cross-linking effect by having the partial structure represented by a plurality of General Formulae (1) in the side chain apart from the main chain since the mobility of the partial structure, which exists in the side chain and contributes to the polymerizing property and cross-linking property, is increased. The inventors infer that, as a result, effects such as fixability are increased. Also by having a polymerizable site represented by the General Formula (1), it is difficult for polymerization hindrance due to oxygen to occur compared with the compound having a polymerizable site with a radical polymerizing property, and therefore, even in the presence of oxygen, the cross-linked structure is rapidly formed and the compact cured film is formed, and as a result, fixability and solvent-resistance of the ink image obtained become excellent. Also, in the present invention, by presenting (b) the polymer compound as particles in the solvent including water, the effect of suppression of degradation, a decomposition of the polymerizable functional group over time due to hydrolysis, is obtained. Also, since the polymer compound of the present invention is non-water-soluble particles, excellent water resistance is shown after the fixing. However, it should be noted that the mechanism is from inference and the present invention is not limited to the mechanism.

<Image Forming Method>

An image forming method of the present invention includes an ink applying step in which the ink composition is applied on the recording medium and a irradiating step in which an active energy rays are irradiated to the applied ink composition. From these steps, the image is formed by the ink composition being fixed on the recording medium.

(Ink Applying Step)

Hereinafter, the ink applying step in the image forming method of the present invention is described. The ink applying step according to the present invention is not limited as long as it is a step in which the ink composition is applied on the recording medium.

An ink jet recording device used in the image forming method is not particularly limited, and well-known ink jet recording devices with which the desired resolution can be achieved may be arbitrarily selected and used. That is, all well-known ink jet recording devices including commercially available ones may carry out discharge of the ink composition to the recording medium in the image forming method of the present invention.

As the ink jet recording device which may be used in the present invention, for example, a device including an ink supplying system, a temperature sensor, and a heating means may be included.

The ink supply system is configured of an original tank including the ink composition of the present invention, a supply pipe, an ink supply tank immediately before an ink jet head, a filter, and a piezo-type ink jet head. The piezo-type ink jet head may be driven so as to discharge multi-size dots of preferably 1 to 100 pl and more preferably 8 to 30 pl at a resolution of preferably 320×320 to 4,000×4,000 dpi, more preferably 400×400 to 1,600×1,600 dpi, and even more preferably 720×720 dpi. Also, the dpi referred to in the present invention represents the number of dots per 2.54 cm (1 inch).

In the ink composition of the present invention, it is preferable that means be provided in which the temperature of the ink composition is stabilized in the ink jet recording device since maintaining the temperature of the ink composition discharged at constant temperature is preferable. The region where the temperature is kept uniform includes all of the piping system from the ink tank (the intermediate tank if there is an intermediate tank) to the nozzle ejection surface and members. That is, insulation and heating of the ink jet head unit and/or from the ink supply tank to the ink jet head unit may be performed.

As a temperature controlling method, while not particularly limited, for example, it is preferable that a plurality of the temperature sensors be installed in each piping unit, and heat control be performed depending on the flow of the ink composition and the environmental temperature. The temperature sensor may be installed in the vicinity of the ink supply tank and the nozzle of the ink jet head. Also, the head unit to be heated is preferably blocked thermally or insulated so that the main unit is not affected by the temperature outside. In order to shorten the start-up time needed for heating the printer, or to reduce the heat energy loss, it is preferable that the heat capacity of the whole heating unit be small along with being insulated from other units.

Using the ink jet recording device, it is preferable that the discharge of the ink composition be carried out after heating the ink composition to preferably 25° C. to 80° C. and more preferably 25° C. to 50° C., and lowering the viscosity of the ink composition to preferably 3 mPa·s to 15 mPa·s and more preferably 3 mPa·s to 13 mPa·s. In particular, it is preferable if the ink composition of which a viscosity is less than or equal to 50 mPa·s at 25° C. is used as the ink composition of the present invention since favorable discharge may be carried out. By using this method, high discharging stability may be achieved.

The temperature of the ink composition when discharged is preferably constant, and as a range within which the temperature of the ink composition is controlled, ±5° C. from the desired temperature is more preferable, ±2° C. from the desired temperature is even more preferable, and ±1° C. from the desired temperature is the most preferable.

The recording medium according to the present invention is not particularly limited and well-known recording media as supports or recording material may be used. As the recording medium, for example, paper, paper laminated with plastic (for example, polyethylene, polypropylene, polystyrene or the like), a metal plate (for example, aluminum, zinc, copper or the like), a plastic film (for example, polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal or the like), paper or a plastic film on which a metal described above is laminated or deposited may be included. Among these, a non-absorbent recording medium as the recording medium may be suitably used since the ink composition of the present invention has excellent adhesive property, and a plastic substrate such as polyvinyl chloride, polyethylene terephthalate, or polyethylene is preferable and a polyvinyl chloride resin substrate is more preferable, and a polyvinyl chloride resin sheet or film is even more preferable.

(Irradiating Step)

Hereinafter, a irradiating step in the image forming method of the present invention is described. The irradiating step in the present invention is not limited as long as it is a step in which the ink composition applied on the recording medium is irradiated with active energy radiation. By radiating the active energy ray to the ink composition of the present invention, a cross-linking reaction of the compounds in the ink composition progresses, the image is fixed; therefore, improving the solvent resistance and the like of the printed material becomes possible. By this irradiating step, the cross-linking reaction by the partial structure, the reactive group in the (b-1) specific compound, represented by the General Formula (1) and the cross-linked structure of the following General Formula (5) is formed in the ink composition. This reaction also occurs among the polymer compound particles, or between the (b-1) specific compound and the polymerizable compound having the partial structure represented by the General Formula (1) included as desired. This cross-linking reaction has a feature such that there is no concern for degradation by oxygen since radicals do not intervene.

Also, prior to the irradiating step, an ink drying step described later may be performed.

[Chem. 36]

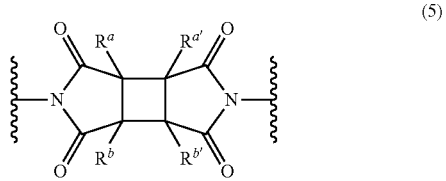

(5)

In the Formula (5), $R^a$, $R^b$, $R^{a'}$ and $R^{b'}$, each independently, represent an alkyl group having the number of carbon atoms 1 to 4, and $R^a$ and $R^b$ may be bonded to each other to form an alicyclic structure with a 4- to 6-membered ring. $R^{a'}$ and $R^{b'}$ may be bonded to each other to form an alicyclic structure with a 4- to 6-membered ring. $R^a$ and $R^b$ are the same as those described in the Formula (P-1), including the preferable ranges. $R^{a'}$ is the same as $R^a$ described in the Formula (P-1), including the preferable range. $R^{b'}$ is the same as $R^b$ described in the Formula (P-1), including the preferable range. Also, the wavy line in the General Formula (5) represents the bonding site with the polymer compound.

As the active energy rays which may be used in the irradiating step, ultraviolet light (hereinafter, also referred to as UV light), visible light, or an electron beam may be included and using UV light is preferable.

As a peak wavelength of the UV light, although dependent on the absorption characteristics of the sensitizing dye used as necessary, for example, 200 to 405 nm is preferable, 220 to 390 nm is more preferable, and 220 to 350 nm is even more preferable. In the present invention when the sensitizing dye or the photopolymerization initiator is not used in combination, 200 to 310 nm is preferable and 200 to 280 nm is more preferable.

It is suitable that the UV light is irradiated with the intensity of illumination at the exposed surface of, for example, 10 mW/cm² to 2,000 mW/cm² and preferably 20 mW/cm² to 1,000 mW/cm².

As a UV light source, a mercury lamp, a gas solid-state laser or the like is mainly used and a mercury lamp, a metal halide lamp or a UV fluorescent lamp is widely known. Also, the replacement of a GaN-based semiconductor for an ultraviolet light emitting device is very useful both industrially and environmentally and an LED (UV-LED), LD(UV-LD) is small, has a long life, has high efficiency, and has a low cost, and thereby is expected to be used as a UV light source. In the present invention, a metal halide lamp, a high-pressure mercury lamp, a medium-pressure mercury lamp, a low-pressure mercury lamp, or a UV-LED is preferable when the sensitizing dye or the photopolymerization initiator is used in combination, and a medium-pressure mercury lamp or a low-pressure mercury lamp is preferable when the sensitizing dye or the photopolymerization initiator is not used.

In the ink composition of the present invention, it is suitable that this UV light radiates, for example, for 0.01 seconds to 120 seconds, preferably for 0.1 seconds to 90 seconds.

Radiation conditions and basic radiation method are disclosed in JP1985-132767A (JP-S60-132767A). Specifically, a method in which the light source is prepared on both sides of the head unit including a discharging device of the ink, and the head unit and the light source scan by a so-called a shuttle method, or a method in which a scan is performed by a separate light source which does not accompany a drive is preferred. Irradiation by the active energy rays is performed after ink impacting and heat fixing for a certain amount of time (for example, for 0.01 seconds to 120 seconds, preferably for 0.01 seconds to 60 seconds).

(Ink Drying Step)

The ink composition discharged on the recording medium is fixed preferably by (a) the water and the water-soluble organic solvent used in combination as necessary being evaporated by a heating means. The step in which the discharged ink composition of the present invention is fixed by applying heat is described.

As the heating means, a means by which the ink composition may be dried by evaporating (a) the water and the water-soluble organic solvent used in combination as necessary may be used, and while not limited, a heat drum, warm air, infrared light lamp, a heating oven, a heating plate or the like may be used.

The heating temperature is preferably greater than or equal to 40° C., more preferably approximately 40° C. to 150° C., and even more preferably approximately 40° C. to 80° C. Also, the drying/heating time is suitably established considering a composition and printing speed of the ink composition.

The ink composition fixed by heating may be further photo-fixed by the active energy ray being irradiated as necessary. Fixing by UV light is preferable.

<Printed Material>

A printed material of the present invention, either provides a image formed from the ink composition of the present invention or an image from the ink composition recorded according to the image forming method of the present invention on the recording medium. Therefore, the printed material of the present invention provides the ink image with excellent fixability and solvent resistance.

EXAMPLES

Hereinafter, the present invention is described in detail using examples. However, the present invention is not limited to these examples. In addition, "parts' and "%" are by mass unless otherwise specified.

Materials of the pigment dispersion and the ink composition used in the examples and comparative examples are shown below.

<Synthesis of Polymer Dispersing Agent E-1>

Methyl ethyl ketone (44 g) was added to a 500 ml three-neck flask equipped with a stirrer and a condenser, then was heated to 72° C. under a nitrogen atmosphere, and a solution of dimethyl 2,2'-azobis(isobutyrate) (0.43 g), benzyl methacrylate (30 g), methacrylic acid (5 g), and methyl methacrylate (15 g) dissolved in methyl ethyl ketone (25 g) was added dropwise thereto for 3 hours. After the dropwise addition was completed and the mixture was further reacted for 1 hour, a solution of dimethyl 2,2'-azobis(isobutyrate) (0.21 g) dissolved in methyl ethyl ketone (1 g) was added, the temperature of the mixture was elevated to 78° C. and heating was performed for 4 hours. The reaction solution obtained was re-precipitated twice in a large excess of hexane, an deposited resin was dried, and polymer dispersing agent E-1 (43 g) was obtained.

The composition of the resin obtained was identified with $^1$H-NMR and the weight average molecular weight (Mw) determined from GPC was 42,000. The weight average molecular weight was measured under the same measuring conditions as the weight average molecular weight of the (b-1) specific polymer compound. In addition, the acid value determined from a method described in JIS standard (JISK0070: 1992) was 65.4 mgKOH/g.

<Preparation of Dispersion of Resin-Coated Pigment>

(Resin-Coated Cyan Pigment Dispersion (C))

A Pigment Blue 15:3 (phthalocyanine blue A220, manufactured by Dainichiseika Color & Chemicals Mfg. Co., Ltd.) (10 parts), the polymer dispersing agent E-1 (5 parts), methyl ethyl ketone (42 parts), 1 mol/L NaOH aqueous solution (5.5 parts), ion-exchanged water (87.2 parts) were mixed and dispersed for 2 to 6 hours with a beads mill using 0.1 mmφ zirconia beads.

By removing methyl ethyl ketone from the dispersion obtained under reduced pressure at 55° C. and by further removing some of the water, a dispersion of resin-coated cyan pigment (C) with the pigment concentration of 10.2 mass % (a cyan dispersed liquid C) was obtained (described as "Dispersion C" in the Table).

(Resin-Coated Black Pigment Dispersion (K))

A resin-coated black pigment dispersion (K) was obtained in the same manner as the resin-coated cyan pigment dispersion except that the pigment dispersing agent CAB-O-JET™ 200 (carbon black, manufactured CABOT Corporation) was used instead of the phthalocyanine blue A220 used as the pigment in the preparation of the resin-coated cyan pigment dispersion (described as "Dispersion K" in the Table).

<Particles of (b) Polymer Compound>

The structure of the polymer compound used in the preparation of the particles of the polymer compound is shown below. The polymer compound was synthesized with reference to JP1977-988A (JP-S52-988A) and JP2009-138172A.

TABLE 1

| | Polymer | Volume Average Particle Diameter (nm) |
|---|---|---|
| Specific polymer | P-1 | 60 |
| Specific polymer | P-2 | 110 |
| Specific polymer | P-3 | 260 |
| Comparative Polymer | B-1 | 120 |
| Comparative Polymer | B-2 | 350 |

[Chem. 37]

P-1

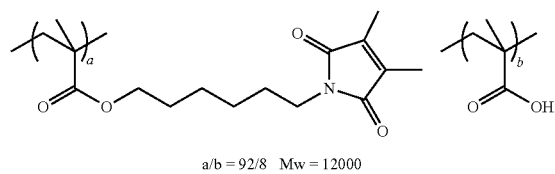

a/b = 92/8  Mw = 12000

TABLE 1-continued

| | Polymer | Volume Average Particle Diameter (nm) |
|---|---|---|

P-2 a/b = 70/30  Mw = 17000

P-3 a/b = 50/50  Mw = 22000

B-1 a/b = 70/30  Mw = 25000

B-2 a/b = 50/50  Mw = 16000

(Preparation of Polymer Particles (D-1))

A solution of isopropyl ether (3 g), ethyl acetate (10 parts), polymer (P-1) (1.5 parts) (50% solid) was prepared. Separately, a mixed liquid of water (18 parts) and EMAL 20 C (manufactured by Kao Corporation) (0.4 parts) was prepared. After mixing the two mixed liquids, the resultant was mixed and emulsified with a homogenizer (manufactured by Nippon Seiki Co., Ltd.) for 9 minutes. The emulsified liquid was stirred and concentrated at 60° C., ethyl acetate was removed to prepare the polymer compound particles with the solid content concentration of 17%. The volume average particle diameter of the polymer compound particles prepared was measured using an LB-500 (manufactured by HORIBA, Ltd.), and it was found to be 60 nm. Hereinafter, this is referred to as polymer particles (D-1).

<Preparation of Polymer Particles (D-2) and (D-3), and Comparative Particles (D'-1) and (D'-2)>

Polymer particles (D-2) and (D-3), and comparative particles (D'-1) and (D'-2) were prepared in the same manner as the preparation of polymer particles (D-1) except that P-1 in the preparation of polymer particles (D-1) was changed to P-2, P-3, B-1, and B-2.

<Water-Soluble Organic Solvent>

2-Pyrrolidone (manufactured by Sigma-Aldrich Japan K.K.)

(Comparative Polymer Compound B-2)

Synthesis was carried out with reference to JP2008-146018A. The structure is shown above.

<Polymerizable Compound>
(Polymerizable Polymer Compound A-1)
The structure is shown below.

[Chem. 38]

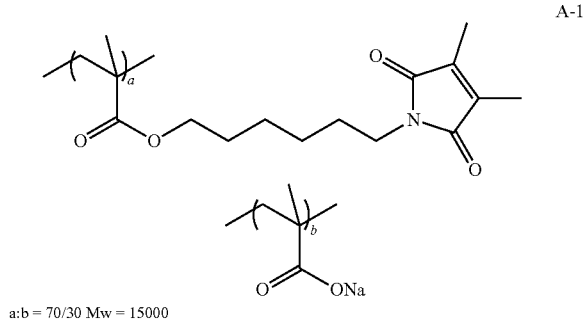

a:b = 70/30 Mw = 15000

(Polymerizable Low Molecular Weight Compound)
HEAA, 2-hydroxyethyl acrylamide (manufactured by Tokyo Chemical Industry Co., Ltd.)
<Polymerization Initiator>
The polymerization initiator according to Table 2 and 3 represents Irgacure 2959 (manufactured by BASF Japan Ltd.).
<Surfactant>
The surfactant described in Tables 2 and 3 is a surfactant selected from SDS (sodium dodecyl sulfate, manufactured by Tokyo Chemical Industry Co., Ltd.) and EMAL 20 C (manufactured by Kao Corporation)
<Preparation of the Ink Composition>
Using the dispersions obtained (dispersion C and dispersion K), the ink compositions with compositions of the Examples 1 to 16 and Comparative Examples 1 to 4 shown in the following Table 2 and Table 3 were prepared, respectively, by stirring at 2,500 rev/minute using a mixer (L4R manufactured by Silverson Machines, Inc.). The ink compositions obtained were packed in a plastic disposable syringe and were filtered using a filter with pore diameter of 5 μm made of polyvinylidene fluoride (PVDF) (Millex-SV, 25 mm in diameter, manufactured by Millipore Corporation) and the finished inks were obtained.
<Evaluation of Ink Compositions>
The ink composition obtained was coated on an 8 cm square vinyl chloride sheet (AVERY 400 GLOSS WHITE PERMANENT made by Avery Dennison Corporation) with a thickness of 12 μm using No. 2 bar of K hand coater manufactured by RK PRINT COAT INSTRUMENTS Ltd. In addition, water was evaporated by drying the coated sheet for 3 minutes at 60° C. and a coated film was formed.
Using the coated film obtained, the following evaluation of fixability was performed. Evaluation results are shown in Table 2 and Table 3.

<Evaluation of Fixability>
The coated film obtained was exposed using a low pressure mercury lamp under conditions such that the received energy was 500 mJ/cm². The degree of fixing of the film surface was evaluated by touching. If the stickiness remained, the exposure was repeated until stickiness disappeared, and the fixability was evaluated by the amount of exposure required to make the stickiness disappear.
A: The stickiness disappeared when exposed once.
B: The stickiness disappeared when exposed 2 to 3 times.
C: The stickiness disappeared when exposed 4 to 5 times.
D: The stickiness did not disappear even when exposed 6 times or more.
<Evaluation of Solvent Resistance>
Using each ink composition and the printed material prepared from the fixability evaluation, evaluation of solvent resistance was performed. The evaluation results are shown in Table 2 and Table 3.
The coated film obtained from the fixability evaluation described above was exposed using a low pressure mercury lamp under conditions such that the received energy was 2000 mJ/cm². A surface of the printed material was rubbed using a cotton swab impregnated with isopropyl alcohol and was evaluated according to the following grades.
A: No changes in the image were observed even when rubbed 10 times or more.
B: The concentration of the image was degraded when rubbed 5 to 9 times.
C: The concentration of the image was degraded when rubbed 2 to 4 times.
D: The concentration of the image was markedly degraded when rubbed just once.
<Evaluation of Discharging Property>
As the ink jet recording device, a commercially available ink jet printer (SP-300V manufactured by Roland DG Corporation) was prepared. Each ink composition obtained was loaded into the ink jet printer and was discharged from the head on a vinyl chloride sheet (AVERY 400 GLOSS WHITE PERMANENT manufactured by Avery Dennison Corporation) for 3 minutes, and a solid image and a thin line were recorded. After stopping the discharge, the image obtained was allowed to stand for 3 minutes. Then again, the image obtained (5 cm×5 cm) was observed by recording a solid image and a thin line. The image observed was evaluated visually according to the following grades. The evaluation results are shown in Table 2 and Table 3.
A: The occurrence of dot omission due to instances of omission was not observed, and a fine image was obtained.
B: The occurrence of dot omission due to instances of omission was observed to a slight extent, however, it was at a level such that there was no problem in practical use.
C: The occurrence of dot omission due to instances of omission was observed, and the image was not able to be practically used.
D: No discharge was possible.

TABLE 2

| | (b) Particles of Specific polymer Compound or article of Comparable Polymer Compound | | | | | (a) Water | | (c) Polymerizable Compound | |
|---|---|---|---|---|---|---|---|---|---|
| | Polymer | Dispersion | Particle Diameter (nm) | Amount used (g) | Amount of Solid (g) | Amount used (g) | Content in Ink (g) | Name | Amount used (g) |
| Example 1 | P-1 | D-1 | 60 | 29 | 5 | 35.5 | 77.5 | — | — |
| Example 2 | P-1 | D-1 | 60 | 59 | 10 | 5.5 | 72.5 | — | — |
| Example 3 | P-1 | D-1 | 60 | 11.6 | 2 | 52.9 | 77.5 | — | — |
| Example 4 | P-2 | D-2 | 110 | 29 | 5 | 35.5 | 77.5 | — | — |

TABLE 2-continued

| | | | | | | | | | |
|---|---|---|---|---|---|---|---|---|---|
| Example 5 | P-3 | D-3 | 260 | 29 | 5 | 35.5 | 77.5 | — | — |
| Example 6 | P-1 | D-1 | 60 | 29 | 5 | 38.5 | 80.5 | HEAA | 2 |
| Example 7 | P-1 | D-1 | 60 | 29 | 5 | 35.5 | 77.5 | A-1 | 5 |
| Example 8 | P-1 | D-1 | 60 | 29 | 5 | 35.5 | 77.5 | HEAA A-1 | 2.5 2.5 |
| Example 9 | P-1 | D-1 | 60 | 29 | 5 | 35.5 | 77.5 | HEAA A-1 | 2.5 2.5 |
| Example 10 | P-3 | D-3 | 260 | 29 | 5 | 35.5 | 77.5 | HEAA A-1 | 2.5 2.5 |
| Comparative Example 1 | B-1 | D'-1 | 120 | 5 | 5 | 59.5 | 77.5 | — | — |
| Comparative Example 2 | B-2 | D'-2 | 350 | 5 | 5 | 59.5 | 77.5 | — | — |

| | (d) Coloring Agent | | (e) Organic Solvent Amount of | (g) Surfactant | | Ink Evaluation | | |
|---|---|---|---|---|---|---|---|---|
| | Pigment Dispersion | Amount used (g) | 2-Pyrrolydone used (g) | Name | Amount used (g) | Fixability | Solvent Resistance | Discharging Property |
| Example 1 | Dispersion C | 20 | 15 | SDS | 0.5 | B | A | A |
| Example 2 | Dispersion C | 20 | 15 | SDS | 0.5 | B | A | B |
| Example 3 | Dispersion C | 20 | 15 | SDS | 0.5 | B | B | A |
| Example 4 | Dispersion C | 20 | 15 | EMAL 20C | 0.5 | B | B | A |
| Example 5 | Dispersion C | 20 | 15 | EMAL 20C | 0.5 | A | A | B |
| Example 6 | Dispersion C | 20 | 10 | SDS | 0.5 | B | B | A |
| Example 7 | Dispersion C | 20 | 10 | SDS | 0.5 | B | A | B |
| Example 8 | Dispersion C | 20 | 10 | SDS | 0.5 | A | A | A |
| Example 9 | Dispersion K | 20 | 10 | EMAL 20C | 0.5 | B | A | A |
| Example 10 | Dispersion C | 20 | 10 | EMAL 20C | 0.5 | A | A | B |
| Comparative Example 1 | Dispersion C | 20 | 15 | SDS | 0.5 | C | C | A |
| Comparative Example 2 | Dispersion C | 20 | 15 | SDS | 0.5 | C | C | C |

TABLE 3

| | (b) Particles of Specific polymer Compound or article of Comparable Polymer Compound | | | | (a) Water | | (c) Polymerizable Compound | | (d) Coloring Agent | |
|---|---|---|---|---|---|---|---|---|---|---|
| | Polymer | Dispersion | Particle Diameter (nm) | Amount used (g) | Amount of Solid (g) | Amount used (g) | Content in Ink (g) | Name | Amount used (g) | Pigment Dispersion | Amount used (g) |
| Example 11 | P-1 | D-1 | 60 | 29 | 5 | 38.5 | 80.5 | HEAA | 2 | Dispersion C | 20 |
| Example 12 | P-1 | D-1 | 60 | 29 | 5 | 35.5 | 77.5 | A-1 | 5 | Dispersion C | 20 |
| Example 13 | P-1 | D-1 | 60 | 29 | 5 | 35.5 | 77.5 | HEAA A-1 | 2.5 2.5 | Dispersion C | 20 |
| Example 14 | P-1 | D-1 | 60 | 29 | 5 | 35.5 | 77.5 | HEAA A-1 | 2.5 2.5 | Dispersion K | 20 |
| Example 15 | P-3 | D-3 | 260 | 29 | 5 | 35.5 | 77.5 | HEAA A-1 | 2.5 2.5 | Dispersion C | 20 |
| Example 16 | P-3 | D-3 | 260 | 29 | 5 | 35.5 | 77.5 | HEAA A-1 | 2.5 2.5 | Dispersion C | 20 |
| Comparative Example 3 | B-1 | D'-1 | 120 | 5 | 5 | 59.5 | 77.5 | — | — | Dispersion C | 20 |
| Comparativ Example 4 | B-2 | D'-2 | 350 | 5 | 5 | 59.5 | 77.5 | — | — | Dispersion C | 20 |

| | (e) Organic Solvent Amount of | (g) Surfactant | | (f) Polymerization Initiator Amount of | Ink Evaluation | | |
|---|---|---|---|---|---|---|---|
| | 2-Pyrrolydone used (g) | Name | Amount used (g) | Irg2959 used (g) | Fixability | Solvent Resistance | Discharging Property |
| Example 11 | 10 | SDS | 0.5 | 1.5 | A | A | A |
| Example 12 | 10 | SDS | 0.5 | 1.5 | A | A | B |
| Example 13 | 10 | SDS | 0.5 | 1.5 | A | A | A |

TABLE 3-continued

| | | | | | | | |
|---|---|---|---|---|---|---|---|
| Example 14 | 10 | EMAL 20C | 0.5 | 1.5 | A | A | A |
| Example 15 | 10 | EMAL 20C | 0.5 | 1.5 | A | A | B |
| Example 16 | 10 | EMAL 20C | 0.5 | 0.5 | A | A | B |
| Comparative Example 3 | 15 | SDS | 0.5 | 1.5 | C | C | A |
| Comparativ Example 4 | 15 | SDS | 0.5 | 1.5 | C | C | C |

Also, in Table 2 and Table 3, "-" indicates that this compound was not included.

As shown in the Table 2 and Table 3, it was confirmed that each ink composition of the examples in the present invention was excellent in discharging property and excellent in solvent resistance of the recorded image and in fixability to the recording medium.

In particular, even when the polymerization initiator was not included as the ink composition or included in very small amounts, the image with excellent fixability was obtained.

The present application is a continuation application of International Application No. PCT/JP2012/066093, filed Jun. 18, 2012, which claims priority to Japanese Patent Application No. 2011-140985, filed Jun. 24, 2011. The contents of these applications are incorporated herein by reference in their entirety.

What is claimed is:

1. An ink composition comprising:
   a dispersion medium including (a) water;
   and particles of (b) a polymer compound existing in the dispersion medium; and (b) the polymer compound includes a repeating unit having a partial structure represented by the following General Formula (1),

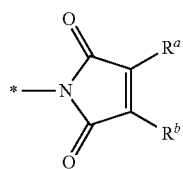

wherein, in the General Formula (1), $R^a$ and $R^b$, each independently, represent an alkyl group having the number of carbon atoms 1 to 4, $R^a$ and $R^b$ may be bonded to each other to form an alicyclic structure with a 4- to 6-membered ring, and * represents a bonding site to a main chain or a side chain in the polymer compound.

2. The ink composition according to claim 1,
   wherein (b) the polymer compound is a polymer compound further including a hydrophilic group.

3. The ink composition according to claim 1,
   wherein the content of the particles of (b) the polymer compound based on the ink composition is 2.0 mass % to 15 mass %.

4. The ink composition according to claim 1,
   wherein the repeating unit included in (b) the polymer compound is a repeating unit represented by the following General Formula (2),

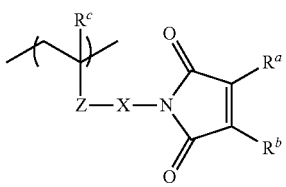

wherein, in the General Formula (2), $R^a$ and $R^b$, each independently, represent an alkyl group having the number of carbon atoms 1 to 4, $R^a$ and $R^b$ may be bonded to each other to form an alicyclic structure with a 4- to 6-membered ring, $R^c$ represents a hydrogen atom or a methyl group, Z represents —COO— or —CONR$^d$—, $R^d$ represents a hydrogen atom or an alkyl group having the number of carbon atoms 1 to 4, and X represents a divalent organic group.

5. The ink composition according to claim 2,
   wherein (b) the polymer compound is a polymer compound including a repeating unit having at least one hydrophilic group selected from the group consisting of an alcoholic hydroxyl group, an alkyl-substituted carbamoyl group, a carboxyl group, a sulfo group and, salts thereof.

6. The ink composition according to claim 1, further comprising:
   (c) a polymerizable compound having a different structure from that of (b) the polymer compound.

7. The ink composition according to claim 6,
   wherein (c) the polymerizable compound includes one or more types of polymerizable low molecular compound with a molecular weight of greater than or equal to 100 and less than 1,000.

8. The ink composition according to claim 6,
   wherein (c) the polymerizable compound includes one or more types of polymerizable polymer compound with a molecular weight of greater than or equal to 1,000 and less than 50,000.

9. The ink composition according to claim 6,
   wherein (c) the polymerizable compound includes one or more types of polymerizable low molecular compound with a molecular weight of greater than or equal to 100 and less than 1,000, and includes one or more types of polymerizable polymer compound with a molecular weight of greater than or equal to 1,000 and less than 50,000.

10. The ink composition according to claim 1,
    wherein the volume average particle diameter of (b) the polymer compound particles is greater than or equal to 20 nm and less than 300 nm.

11. The ink composition according to claim 1, further comprising:
    (d) a pigment dispersion.

12. The ink composition according to claim 11, wherein (d) the pigment dispersion is a resin-coated pigment dispersion.

13. The ink composition according to claim 1, further comprising:
(e) a water-soluble organic solvent.

14. The ink composition according to claim 1, further comprising:
(f) a photopolymerization initiator.

15. The ink composition according to claim 1, further comprising:
(g) a surfactant.

16. An image forming method comprising:
an ink applying step in which the ink composition according to claim 1 is applied on a recording medium; and
an irradiating step in which the ink composition applied on the recording medium is irradiated with active energy radiation.

17. An image forming method comprising:
an ink applying step in which the ink composition according to claim 1 is applied on a recording medium,
an ink drying step in which at least part of (a) the water and (e) the water-soluble organic solvent contained in the ink composition applied on the recording medium is dried and removed; and
an irradiating step in which the ink composition applied on the recording medium is irradiated with active energy radiation.

18. A printed material comprising;
an image formed from the ink composition according to claim 1 on a recording medium.

19. A printed material having an image formed by the image forming method according to claim 16.

20. A printed material having an image formed by the image forming method according to claim 17.

* * * * *